(12) United States Patent
Franke

(10) Patent No.: US 8,487,568 B2
(45) Date of Patent: Jul. 16, 2013

(54) CIRCUIT ARRANGEMENT FOR AN ELECTRIC DRIVE

(75) Inventor: Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 121 days.

(21) Appl. No.: 13/019,704

(22) Filed: Feb. 2, 2011

(65) Prior Publication Data

US 2011/0133677 A1 Jun. 9, 2011

Related U.S. Application Data

(63) Continuation of application No. PCT/EP2009/005230, filed on Jul. 18, 2009.

(30) Foreign Application Priority Data

Aug. 8, 2008 (DE) .................. 10 2008 037 064

(51) Int. Cl.
*H02P 27/00* (2006.01)
*H02P 27/04* (2006.01)

(52) U.S. Cl.
USPC .................. 318/400.3; 318/400.13; 318/800; 307/86

(58) Field of Classification Search
USPC ............. 318/400.3, 400.13, 800, 801, 808, 318/809, 105; 307/64, 65, 75, 10.1, 43, 86; 361/82, 84, 111; 363/55, 98
See application file for complete search history.

(56) References Cited

U.S. PATENT DOCUMENTS

| | | | | |
|---|---|---|---|---|
| 3,816,768 A | * | 6/1974 | Stein | 327/545 |
| 4,326,157 A | * | 4/1982 | Herbert | 318/809 |
| 5,654,862 A | * | 8/1997 | Worley et al. | 361/111 |
| 5,726,506 A | * | 3/1998 | Wood | 307/147 |
| 5,796,175 A | * | 8/1998 | Itoh et al. | 307/10.1 |
| 5,912,813 A | * | 6/1999 | Kerkman et al. | 363/98 |
| 5,990,654 A | * | 11/1999 | Skibinski et al. | 318/800 |
| 5,990,658 A | * | 11/1999 | Kerkman et al. | 318/811 |
| 6,008,616 A | * | 12/1999 | Nagayama et al. | 318/773 |
| 6,091,164 A | * | 7/2000 | Buell | 307/82 |
| 6,242,884 B1 | * | 6/2001 | Lipo et al. | 318/808 |
| 6,594,163 B2 | * | 7/2003 | Tsai | 363/50 |

(Continued)

FOREIGN PATENT DOCUMENTS

| | | |
|---|---|---|
| DE | 199 54 306 A1 | 7/2001 |
| DE | 10 2005 016 177 A1 | 10/2006 |

(Continued)

OTHER PUBLICATIONS

International Search Report dated Oct. 29, 2009 including English translation (Six (6) pages).

(Continued)

*Primary Examiner* — Paul Ip
(74) *Attorney, Agent, or Firm* — Crowell & Moring LLP

(57) ABSTRACT

A circuit arrangement is provided for supplying an electric drive, to which at least two electric energy sources can be connected. At least one of the at least two electric energy sources supplies at least intermittently the electric drive by way of at least one actuating element. At least one electric energy source can be disconnected from the electric drive by way of a switch. Furthermore, a method for operating the circuit arrangement, as well as a motor vehicle including the circuit arrangement, are provided.

20 Claims, 12 Drawing Sheets

U.S. PATENT DOCUMENTS

| | | | |
|---|---|---|---|
| 6,777,909 B1 | 8/2004 | Aberle et al. | |
| 6,930,869 B1 * | 8/2005 | Zansky et al. | 361/84 |
| 7,091,625 B2 * | 8/2006 | Okusawa et al. | 290/1 R |
| 7,109,681 B2 * | 9/2006 | Baker et al. | 318/801 |
| 7,332,833 B2 * | 2/2008 | Pan et al. | 307/65 |
| 7,379,282 B1 * | 5/2008 | Zansky | 361/82 |
| 7,439,697 B2 * | 10/2008 | Miyazaki et al. | 318/400.41 |
| 7,538,449 B2 | 5/2009 | Schreiber | |
| 7,719,138 B2 * | 5/2010 | Gallegos-Lopez et al. | 307/43 |
| 7,750,505 B2 | 7/2010 | Ichikawa | |
| 7,893,560 B2 * | 2/2011 | Carter | 307/64 |
| 7,990,098 B2 * | 8/2011 | Perisic et al. | 318/801 |
| 8,076,883 B2 | 12/2011 | Wallner | |
| 8,115,433 B2 * | 2/2012 | Welchko | 318/400.13 |
| 2002/0044465 A1 * | 4/2002 | Tsai | 363/55 |
| 2004/0212194 A1 * | 10/2004 | Okusawa et al. | 290/1 R |
| 2005/0127882 A1 * | 6/2005 | Pan et al. | 323/268 |
| 2006/0043922 A1 * | 3/2006 | Baker et al. | 318/807 |
| 2006/0127704 A1 | 6/2006 | Raiser | |
| 2006/0152085 A1 * | 7/2006 | Flett et al. | 307/75 |
| 2007/0222413 A1 | 9/2007 | Kinoshita et al. | |
| 2009/0033251 A1 * | 2/2009 | Perisic et al. | 318/105 |
| 2009/0066163 A1 * | 3/2009 | Gallegos-Lopez et al. | 307/86 |
| 2010/0066431 A1 * | 3/2010 | Carter | 327/408 |
| 2010/0072928 A1 * | 3/2010 | Welchko | 318/400.13 |
| 2011/0133677 A1 | 6/2011 | Franke | |

FOREIGN PATENT DOCUMENTS

| | | |
|---|---|---|
| DE | 10 2005 016 300 A1 | 10/2006 |
| DE | 10 2008 037 064 A1 | 2/2010 |
| GB | 2 175 155 A | 11/1986 |
| JP | 2000-125411 A | 4/2000 |
| JP | 2004-166376 A | 6/2004 |
| JP | 2007-295701 A | 11/2007 |
| WO | WO 2006/132052 A2 | 12/2006 |

OTHER PUBLICATIONS

PCT/IB/338, PCT/IB/373, and PCT/ISA/237 including English-language translation (Eight (8) pages).

* cited by examiner

CIRCUIT ARRANGEMENT FOR AN ELECTRIC DRIVE

CROSS-REFERENCE TO RELATED APPLICATIONS

This application is a continuation of PCT International Application No. PCT/EP2009/005230, filed Jul. 18, 2009, which claims priority under 35 U.S.C. §119 from German Patent Application No. DE 10 2008 037 064.9, filed Aug. 8, 2008, the entire disclosures of which are herein expressly incorporated by reference.

BACKGROUND AND SUMMARY OF THE INVENTION

The invention relates to a circuit arrangement for an electric drive, a method for its operation and a motor vehicle comprising the circuit arrangement.

For supplying electrical energy in vehicles there are various energy storage systems. Useful are, for example, double layer capacitors with a high power density and low energy density, batteries with average power and energy density, as well as fuel cell systems with low power density and high energy density.

These energy storage systems are used predominantly in a single source mode in hybrid and/or electric vehicles. The prior art discloses proposals that treat the respective limitations of the accumulators with respect to the power and energy density by means of a parallel or series circuit of different kinds of accumulators. In this case a coupling of the different kinds of accumulators can be controlled by means of switches and/or power electronic valves as a function of the state of charge of the individual accumulators.

There are also circuits that connect together the power circuits of various voltage levels and influence the energy exchange between these power circuits. Typically, DC/DC converters are used to this end.

The known strategies have the drawback that when the motor vehicle, exhibiting a noteworthy cruising radius and in a cycle with practical acceleration values, is running exclusively in electric mode, an energy efficient operation is not possible. Vehicles with double layer capacitors achieve outstanding acceleration values with simultaneously low accumulator weight and high efficiency, but have permitted to date only a few hundred meters travel in electric mode. Vehicles with batteries make possible travel of several kilometers in electric mode. However, the losses occurring in the batteries at higher power conversions (air conditioning) can be compensated only with a lot of engineering effort and lead to a very low system efficiency. Vehicles with a fuel cell drive are currently not cost effective owing to the high power output costs and the high power-to-weight ratio.

A parallel circuit of a double layer capacitor and a battery results in an additional energy conversion between the two accumulators (power circuits for charge balancing in the case of voltage asymmetry) and, thus, to a reduction in the system efficiency.

A series circuit of capacitors and batteries leads to additional complexity in the control of the state of charge. Both types of accumulators differ in their self-discharging behavior. In order to compensate, an active recharging or a discharging of at least one portion of the accumulators is necessary, as a result of which the system efficiency is also significantly decreased.

The object of the invention is to avoid the aforementioned drawbacks and to provide, in particular, a strategy for decoupling various energy accumulators while simultaneously taking into consideration any energy balancing processes and, in particular, to ensure high efficiency in the course of supplying an electric drive by means of several different energy sources.

This and other objects are achieved with a circuit arrangement and method for supplying an electric drive, to which at least two electric energy sources can be connected. At least one of the at least two electric energy sources supplies at least intermittently the electric drive by way of at least one actuating element. At least one electric energy source can be disconnected from the electric drive by way of a switch.

With this strategy it is possible to combine together different or multiple identical electric energy sources including, for example, electric buffers and/or electric energy accumulators for the purpose of supplying an electric drive. The energy sources can differ significantly with respect to power and/or no-load voltage. In fact, the electric drive can be supplied even as a function of the respective properties or operating points of the electric energy sources that are used. The switch is constructed preferably as an electric switch.

At this point it must be pointed out that the electric energy source can also include various electric energy accumulators. Furthermore, it must be pointed out that the batteries mentioned herein are, in particular, rechargeable.

In particular, the electric energy source may also be an energy supply system, a generator, solar cells or thermoelements. Similarly it is possible that, instead of the electric drive, another electric consumer or another electric source and/or an electric supply system with at least a slightly inductive behavior is used. At the same time the inductive behavior can be inherently present or given by means of additional elements, for example, a throttle. In particular, the number of phases of the electric drive (of the consumer or the source, etc.) as well as their fundamental electric frequency is irrelevant for the operating principle.

It is a further development that the switch is designed so as to be uncontrolled and comprises, in particular, a diode.

It is an additional further development that the switch is a controlled switch comprising at least one of the following components:
  a transistor;
  an IGBT [isolated gate bipolar transistor];
  an FET [field effect transistor]; in particular, a MOSFET [metal oxide semiconductor field effect transistor];
  a thyristor;
  a triac; and/or
  a dynistor.

It is, in particular, a further development that at least those electric energy sources that exhibit a direct voltage that is lower than that of the other energy sources can be disconnected from the electric drive by means of the switch. The direct voltage can be the no-load voltage of the electric energy source.

Correspondingly, the electric energy source that originates from the at least two electric energy sources and that exhibits a higher direct voltage or no-load voltage than the other electric energy sources can be connected permanently (thus, without an active switch) to the electric drive.

It is also a further development that the electric drive comprises an electric machine. In particular, the electric drive can have a plurality of electric machines. For example, the electric machine can be constructed as a multi-phase electric machine. Preferably one or more electric machines can be provided in a motor vehicle.

Furthermore, in one aspect the at least two electric energy sources are disposed with the circuit arrangement in a motor vehicle.

In particular, the strategy described herein can be added to a motor vehicle with an internal combustion engine.

In accordance with an additional further development, the electric energy source comprises one of the following energy sources:
 a fuel cell;
 a battery; or
 a capacitor source, in particular, a double layer capacitor source.

A next further development consists of the actuating element comprising an inverter bridge. In particular, the inverter bridge (also called the inverter) can be designed so as to support three phases. In one embodiment each electric energy source has an inverter bridge. As an alternative, a single inverter bridge can be provided for the at least two electric energy sources.

An alternative embodiment consists of providing a buffer to absorb and/or make available electric energy. The electric buffer is disposed preferably in a freewheeling path so that excess energy can be absorbed especially from the electric drive and, if desired, consumed. In particular, one of the electric energy sources can be designed as an electric buffer.

In another embodiment the buffer exhibits a voltage that is essentially at least as large as the largest voltage—especially the largest no-load voltage—of the electric energy sources.

In yet another embodiment the buffer exhibits a voltage that is essentially at least as large as the maximum voltage of the electric drive.

A further development consists of configuring the buffer in such a way that it absorbs the energy that is stored inductively in the electric drive and releases this energy to either the electric drive or another consumer.

The electric buffer can be designed as any possible variant of an electric energy source (for example, as a capacitor, battery, especially in combination with a varistor or the like).

One embodiment consists of connecting in series at least two electric energy sources. This approach makes it possible to use in an advantageous way various energy sources exhibiting different power levels.

It is another embodiment that the at least two series-connected electric energy sources can be activated individually or together. In this way a multi-level strategy for different voltages can be made available by use of the at least two electric energy sources. Depending on how the electric energy sources are connected to the system, only one energy source can be, for example, active, or both energy sources can be active. The term "active" is understood herein to mean that the energy source supplies the electric machine or receives energy from the electric machine.

For example, different voltage levels can be made available for the electric machine in that in a first state only one of the two energy accumulators supplies the electric machine with energy, and in a second state both energy accumulators supply the electric machine with energy. For example, the energy accumulator that is activated in the second state can make available a high voltage for a short period of time, in order to complement (boost) the basic supply of the other energy accumulator.

It is also a further development that the at least two series-connected electric energy sources can be activated individually or together by means of at least one electronic switch.

Another further development consists of providing a changeover switch, by which it is possible to switch between the electric energy sources. For example, it is possible to switch between a first group of energy sources and a second group of energy sources in such a way that each group has at least one energy source. In particular, if one group is activated due to the switching operation, then the other group is deactivated. It is also possible that the changeover switch switches between several groups of energy sources (multiport switch).

In addition, it is a further development that at least one electric energy source is a mono-directional energy source. As a result, the mono-directional energy source can be provided either only for supplying the electric machine, or the electric machine can transmit only energy into the mono-directional energy source. It is also possible that an energy source is configured so as to be temporarily mono-directional (for example, by use of a switchable diode).

In another development the at least two electric energy sources exhibit different voltages and/or different power outputs.

Moreover, the invention may be provided in a motor vehicle having at least one electric drive and at least two electric energy sources, as well as the circuit arrangement, described herein.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
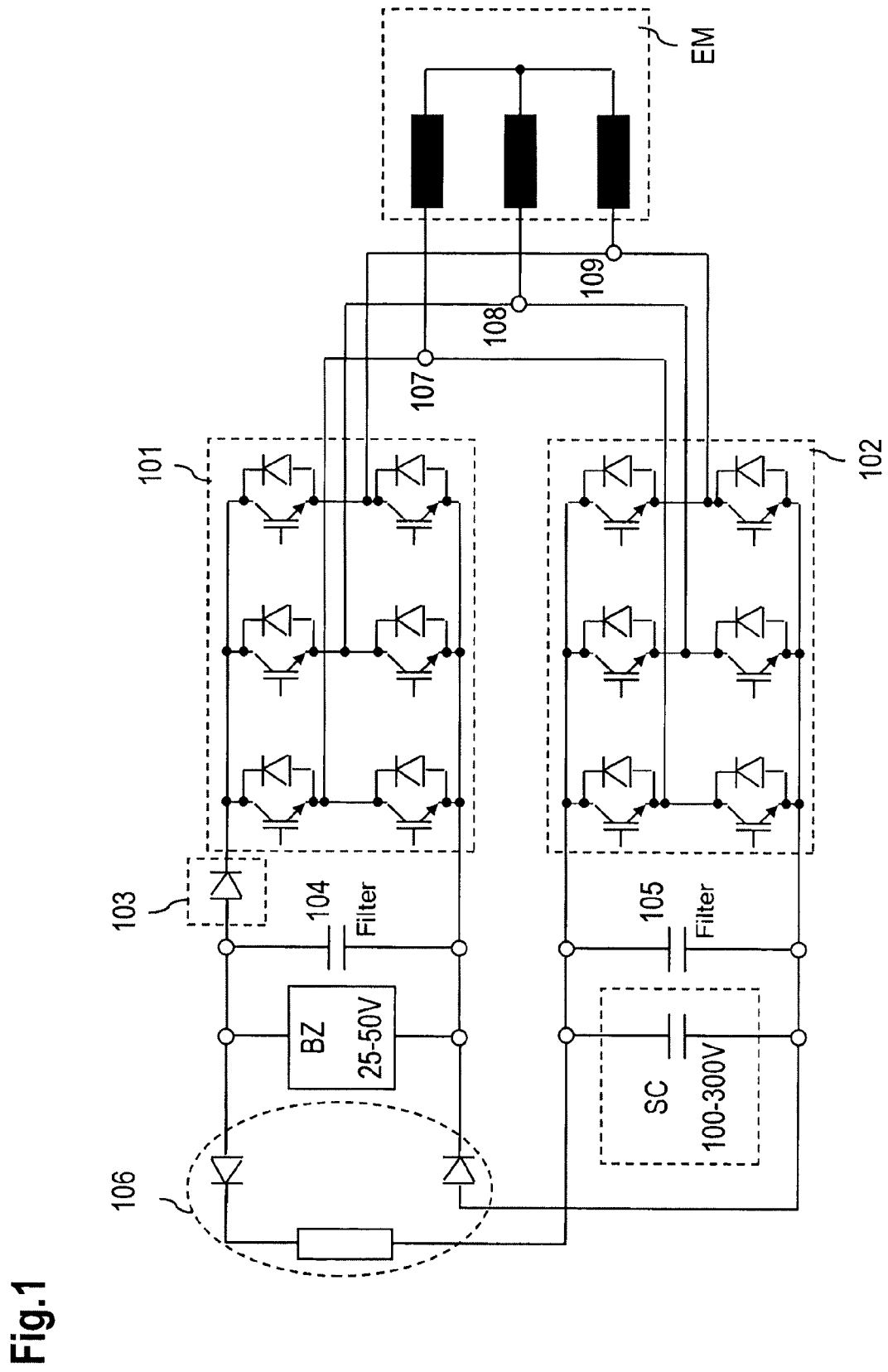
FIG. 1 is a schematic circuit diagram of one example of an arrangement for the parallel operation of energy accumulators without an overlap area of the operating voltages.

The strategy that is proposed herein connects various electric (energy) sources (also (electric) energy accumulators)

especially by way of control circuits, assigned to the electric sources, to the connectors of an electric drive comprising, for example, at least one electric machine.

In this case the control circuits of the electric sources correspond to the circuits for operating electric machines on direct voltage supply systems, which are expanded to include at least to some extent those elements that can suppress, in particular at least intermittently, the flow of energy into the respective source.

In the case that this energy flow is to be permanently suppressed (for example, when connecting a fuel cell), such an element can be configured so as to be uncontrolled (for example, by way of at least one diode).

In the case that this energy flow is to be suppressed only during certain states of the system, the element can be configured so as to be controlled (for example, using at least one transistor, IGBT, FET, thyristor, triac and/or dynistor).

Hence, it is possible to dispense with the elements, which at least partially and/or intermittently suppress the energy flow, for those electric sources that exhibit in all operating states a direct voltage that is higher than that of the respective other electric sources of the whole unit, and/or where a source impedance is suitable for limiting the balancing current, flowing between the electric sources, such that the whole unit or system and/or parts thereof are not damaged.

Preferably a buffer and/or filter capacitor, which is present in any event to reduce the load on the respective electric energy accumulator, can be provided between the electric accumulator and the additional switching element.

In particular, at least one commutating capacitor or a so-called snubber circuit, which compensates for the commutating reactive power of the individual switches, can be provided between the additional switching element and the inverter branches, more particularly at the inverter branches. The capacitors, which are used, for example, for this purpose, exhibit preferably a low capacitance at a high current-carrying capacity. To this end, it is possible, to use, for example, ceramic capacitors.

It is also possible to provide additional inductances at the phase outputs of the inverter branches. These inductances decouple the inverters, which run parallel with respect to the motor terminals and the unavoidable coupling capacitances (for example, by means of control units, precharging circuits, housing capacitances and Y capacitors), using high frequency technology. These inductances are preferably dimensioned significantly smaller than the inductances of the electric machine windings and compensate at least partially with their inductive reactive power, in particular, for the capacitive reactive power of the coupling capacitances between the various parts of the energy system.

The scenarios "parallel operation of energy accumulators without overlap area of the operating voltage" and "parallel operation of energy accumulators with overlap area of the operating voltage" are explained below by way of some embodiments as examples. To this end, different combinations of electric energy sources (double layer capacitors and fuel cell or double layer capacitors and battery) are shown that can be suitably replaced or supplemented by different combinations of the same or different electric energy sources or energy accumulators (for example, fuel cell and battery, battery and battery, etc.).

Correspondingly the illustrated scenarios can be expanded to include a plurality of electric energy sources as well as electric machines with multi-winding systems and/or additional winding taps (integrated transformer). Multi-winding systems and/or additional winding taps are especially practical, if the various electric energy sources and/or electric energy accumulators differ significantly in their terminal voltage and their contribution to the system's power output. Preferably all of the voltages, currents and switching elements in arrangements with multi-winding systems or additional winding taps have to be recalculated to a reference plane according to the known rules for transformational translation.

Embodiment (A)

FIG. 1 shows one example of an arrangement that is intended for "parallel operation of energy accumulators without overlap area of the operating voltages," and includes: a double layer capacitor source SC of high voltage (100-300 V), a fuel cell BZ of low voltage (25-50 V), (three phase) inverter 101 and 102, and an electric machine EM.

A filter 104, for example, in the form of a capacitor, is provided in parallel with the fuel cell BZ. An inverter bridge and/or an inverter 101 is connected via an element 103 for suppressing the backflow of energy into the fuel cell BZ.

The inverter has a parallel circuit composed of three series circuits, each of which exhibits two electric switches. Each of the series circuits has a center tap between the electric switches, so that each center tap is connected to one of the nodes 107 to 109.

An example of an electric switch is an IGBT, where for each IGBT there is a freewheeling diode arranged inversely to the collector-emitter path. The individual electric switches of the inverter 101 are suitably activated or deactivated by way of an actuating unit (not illustrated).

A coil of the electric machine EM is disposed at each of the nodes 107 to 109.

The double layer capacitor source SC is connected in parallel with a filter 105 and connected to an inverter 102, the construction of which is identical to that of the inverter 101. The inverter 101 is also connected at the output to the nodes 107 to 109 by way of the three center taps of the electric switches.

Furthermore, the fuel cell BZ is connected to the double layer capacitor source SC by way of a precharging circuit 106. To this end, the positive pole of the fuel cell BZ is connected to the positive pole of the double layer capacitor source SC by way of a diode (anode-cathode) and a resistor. The negative pole of the fuel cell BZ is connected to the negative pole of the double layer capacitor source SC by way of a diode (cathode-anode).

If, for example, the double layer capacitor source SC is operated with a state-of-charge dependent voltage between 300 V and 100 V, and the fuel cell BZ is operated with a load-dependent voltage between 50 V and 25 V, then the control circuit for the fuel cell BZ is supplemented with the element 103 for suppressing the energy flow, in order to prevent balancing currents in the direction of the fuel cell BZ when in operation.

The balancing current from the fuel cell BZ in the direction of the empty double layer capacitor source SC (in this case the voltage of the double layer capacitor source SC is less than the voltage of the fuel cell BZ, for example, when the double layer capacitor source SC is put into operation) is actively limited for a short period of time by the relatively large impedance of the fuel cell BZ.

Preferably, a precharging circuit 106 exhibiting a low power output (for example, diodes with resistor) is provided between the fuel cell BZ and the double layer capacitor source SC. This precharging circuit 106 limits the minimum voltage of the double layer capacitor source SC to the voltage of the fuel cell BZ. By comparing the two source voltages in the control circuits, a startup of the control circuit between the fuel cell BZ and the electric machine EM can be suppressed as a function of an operating state, for example, up to the end of the precharging of the double layer capacitor source SC to the voltage of the fuel cell BZ (pulse blocking).

The energy flow between the different energy accumulators and the electric machine and/or from the fuel cell BZ into the double layer capacitor source SC is achieved by a suitable activation of the respective control circuits.

A single mode operation of the electric machine EM on the double layer capacitor source SC (in generator and/or motor mode in the case of a passive fuel cell BZ) is performed by suitably actuating the inverter 102. For this operation it is possible to deactivate the inverter 101 between the fuel cell BZ and the electric machine EM (pulse blocking) or to actuate synchronously with the inverter 102 of the double layer capacitor source SC, in such a way that the branch of the fuel cell does not influence the function.

A single mode operation of the electric machine EM on the fuel cell BZ (in motor mode in the case of a passive double layer capacitor source SC) is performed by actuating the inverter 101 when the inverter 102 is inactive (pulse blocking). The diode 103 between the fuel cell BZ and the inverter 101 prevents even a temporary backfeed of energy into the fuel cell BZ. It is preferred that the switching states at the inverter 101 that could result in backfeeding be excluded during the single mode operation of the electric machine EM on the fuel cell BZ. Such a state is possible, for example, if during this operation the switching states that could result in an active reduction in the amount of current in the motor windings are avoided. In the event that a vector model is used, the control unit has only current vectors that result in a voltage that is unidirectional to the actual phase current, as well as the zero vector, which lead to the short circuiting of the motor windings. However, the vector model does not have any vectors that result in a voltage at the electric machine EM that is directed contrary to the actual current.

An energy transfer from the fuel cell BZ into the double layer capacitor source SC is performed by using the switching states of the inverter 101 of the fuel cell BZ that are not used in the single mode operation of the electric machine EM on the fuel cell BZ (with reference to the vector model this corresponds to the vectors that result in a voltage at the electric machine EM that is directed contrary to the actual current). Owing to the diode 103 the voltage increases during those switching states that suppress in connection with the diode 103 the current flow in the electric machine EM by way of the inverter 101, to the extent that the energy is fed back via the inverter 102 into the double layer capacitor source SC. In this case the inverter 101 is regulated taking into consideration the voltage of the double layer capacitor source SC, in order to determine the time duration of this state for optimal backfeeding.

The four operating cases (in motor mode by way of the fuel cell BZ, in motor mode by way of the double layer capacitor source SC, in generator mode by way of the double layer capacitor source SC and charging of the double layer capacitor source SC from the fuel cell BZ) can be mutually overlaid. Therefore, in the event that there are electric connections between the fuel cell BZ and the double layer capacitor source SC (for example, due to Y capacitors between the energy subsystems and a reference potential of the housing and/or ground) it can be guaranteed that owing to the inverters that run parallel with respect to the terminals of the electric machine EM, no short circuit of the energy sources will occur (indirect bridge short circuit by way of the switches of both inverters). This state is achieved by a power-on locking (dead time monitoring) for the individual switches that adequately considers the switching states of the respective other inverter with respect to the switching states in one's own inverter.

At the same time it is also possible to mix the operating cases, in order to, for example, assign the electric energy accumulators to different segments of a time duration or period of the fundamental electric wave as a function of the accumulators' actual voltage and/or their power output capability. Thus, this mixing of the operating cases results in the optimal use of the electric machine and the electric energy accumulators.

Embodiment (B)

Figure 2:
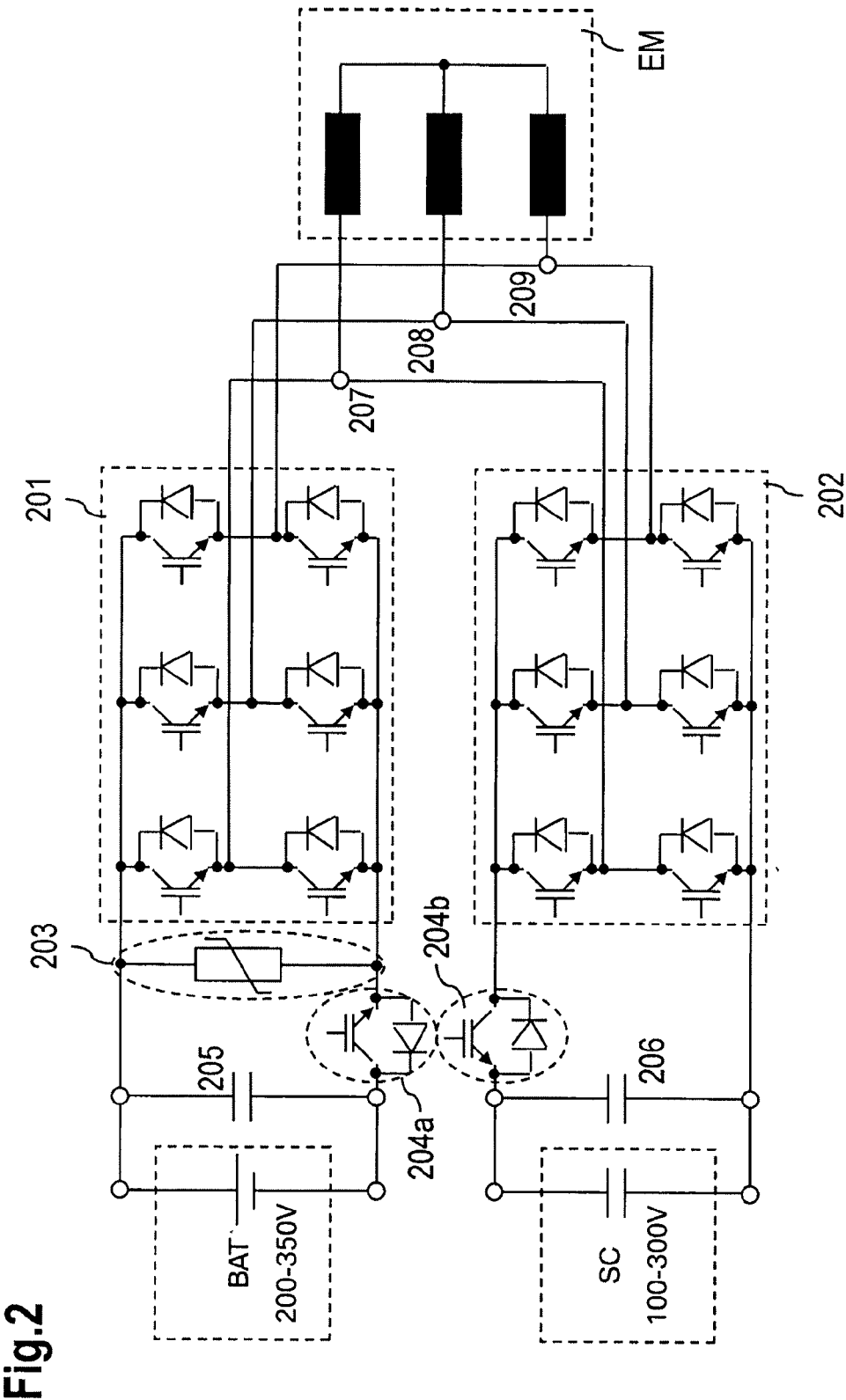
FIG. 2 is a schematic circuit diagram of one example of an arrangement for the parallel operation of energy accumulators with an overlap area of the operating voltages.

FIG. 2 shows one example of a "parallel operation of energy accumulators with overlap area of the operating voltages," including: a double layer capacitor source SC of high voltage (100-300 V), a battery BAT of high voltage (200-350 V), (three phase) inverter 201, 202, and an electric machine EM.

A filter 205 in the form of a capacitor is provided in parallel with the battery BAT. The battery BAT is connected to an inverter 201 by way of an element 204a for suppressing the flow of energy. The element 204a is arranged, for example, in the negative branch of the battery BAT and is designed as a controlled element. To this end, the element 204a has an IGBT with a freewheeling diode that is polarized inversely to the collector-emitter path. Preferably, the input of the inverter 201 has an excess voltage safety switch 203.

A filter 206 in the form of a capacitor is provided in parallel with the double layer capacitor source SC. The double layer capacitor source SC is connected to an inverter 202 by way of an element 204b for suppressing the flow of energy. The element 204b is disposed, for example, in the positive branch of the double layer capacitor source SC and is designed as a controlled element. To this end, the element 204b has an IGBT with a freewheeling diode, which is polarized inversely to the collector-emitter path.

The inverters 201, 202 are constructed in each case in a manner analogous to the inverter 101 from FIG. 1. The inverters 201, 202 are connected at the output to the nodes 207 to 209 by way of the three center taps of the electric switches. Each of the nodes 207 to 209 has a coil of the electric machine EM.

If, for example, the double layer capacitor source SC is operated with a state-of-charge dependent voltage between 300 V and 100 V and the battery BAT is operated with a load-dependent voltage between 350 V and 200 V, then the control circuit for the battery BAT and the control circuit for the double layer capacitor source SC must also be supplemented with the elements 204a, 204b for temporarily suppressing the energy flow, in order to prevent balancing currents when the respective energy source is in operation, without simultaneously limiting the receptivity for regenerative energy.

A single mode operation of the electric machine EM on the double layer capacitor source SC (in generator and/or motor mode in the case of a passive battery BAT) is performed by suitably actuating the inverter 202, while the switch 204a for backfeeding into the battery BAT blocks. For this operation it is advantageous to deactivate the inverter 201 (pulse blocking), because in the example according to FIG. 2 the voltage of the double layer capacitor source SC can be lower than the voltage of the battery BAT.

A single mode operation of the electric machine EM on the battery BAT (in generator mode and/or in motor mode in the case of a passive double layer capacitor source SC) is performed by suitably actuating the inverter 201 while the switch 204b for backfeeding into the double layer capacitor source SC blocks. For this operation it is advantageous to switch the inverter 202 into an inactive state (pulse blocking), because the voltage of the battery BAT can be lower than the voltage of the double layer capacitor source SC.

An energy transfer from the double layer capacitor source SC in the direction of the battery BAT and/or in the opposite direction occurs, as described above with reference to FIG. 1. That is, the electric switch 204a or 204b respectively of the energy releasing accumulator for backfeeding blocks. Preferably, the controllability of the switch can be used for the backfeeding, in order to modulate the current in the source and, thus, to reduce the load on the accumulators with a ripple current as well as to improve the electromagnetic compatibility of the circuit and to guarantee a function for precharging an accumulator.

The six operating cases (in motor mode by way of the battery BAT, in generator mode by way of the battery BAT, in motor mode by way of the double layer capacitor source SC, in generator mode by way of the double layer capacitor source SC, charging of the double layer capacitor source SC from the battery BAT and charging of the battery BAT from the double layer capacitor source SC) can be overlaid, as described above. At the same time it is possible to change the direction of the flow of energy in each control cycle for the inverter bridges 201, 202 and/or the additional switches 204a, 204b. This modulation makes it possible to achieve small loads on the energy accumulators due to ripple currents with simultaneous good controllability of the power output split between the energy accumulators.

The accumulator properties of the inductances of the electric machine EM provide that the current flow in these inductances cannot be disrupted. It is guaranteed—preferably by interconnecting the control signals of the different switches 204a, 204b for the backfeeding of energy into the individual sources—that an energy system will always allow energy to be absorbed from the electric machine EM. The simplest way to achieve this goal is by an EXCLUSIVE-OR actuation of the switches 204a and 204b.

Furthermore, an additional element can be provided that can absorb, store or dissipate the energy, fed back from the electric machine, independently of the actuation of the different energy sources, as soon as the allowable system voltage is exceeded. To this end, it is advantageous to reserve a redundant path that is intended for the absorption of energy and that actively prevents the destruction of the components and/or the unit or any other danger, even if the control unit fails (that is, in the event of defective inverters 201, 202). The path for energy absorption is designed expediently as a function of the amounts of energy that are to be converted:

(a) in the case of small amounts of energy: suppressor diodes or varistors;

(b) in the case of average amounts of energy: capacitors, coupled to the inverter bridges by way of diodes, with discharge circuits (resistors, etc.); or (c) in the case of large amounts of energy: additional inverter with buffer (battery, capacitor) at the motor terminals.

Preferably, the buffer always exhibits the maximum possible voltage when the whole system is running and, therefore, does not need an element that suppresses or limits the backfeeding. Preferably the buffer is controlled in a manner analogous to the example in FIG. 1.

Embodiment (C)

Figure 3:
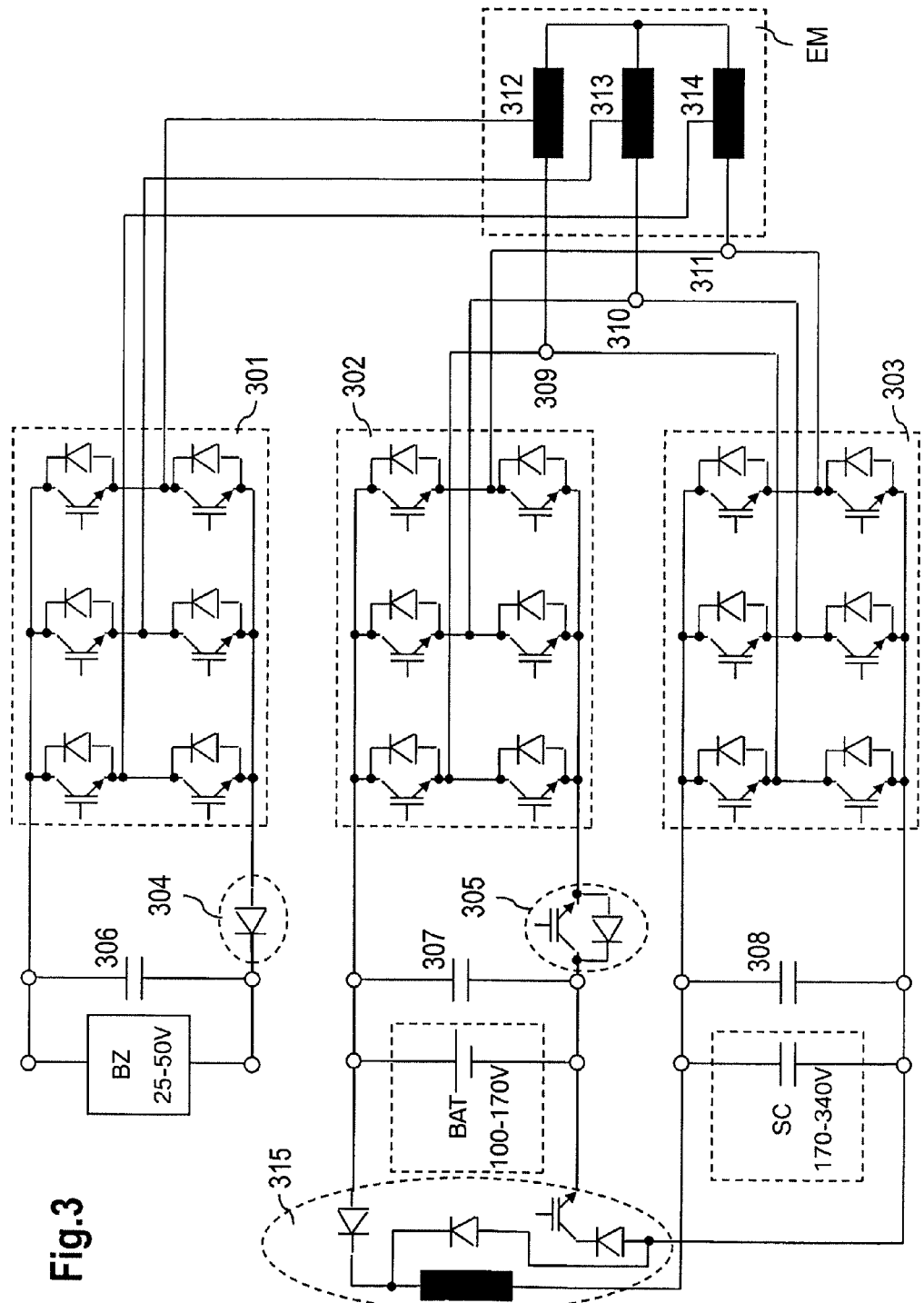
FIG. 3 is a schematic circuit diagram of another example of an arrangement for the parallel operation of several energy accumulators without an overlap region of the operating voltages.

FIG. 3 shows one example of a "parallel operation of energy accumulators without overlap area of the operating voltages" including: a double layer capacitor source SC of high voltage (170-340 V), a battery BAT of average voltage (100-170 V), a fuel cell BZ of low voltage (25-50 V), (three phase) inverter 301, 302, 303, and an electric machine EM with integrated transformer.

A filter 308 in the form of a capacitor is provided in parallel to the double layer capacitor source SC. The double layer capacitor source SC is connected to an inverter 303.

A filter 307 in the form of a capacitor is provided in parallel to the battery BAT. The battery BAT is connected to an inverter 302 by way of an element 305 for suppressing the flow of energy. The element 305 is arranged, for example, in the negative branch of the battery BAT and is designed as a controlled element. To this end, the element 305 has an IGBT with a freewheeling diode that is polarized inversely to the collector-emitter path.

A filter 306 in the form of a capacitor is provided in parallel to the fuel cell BZ. The fuel cell BZ is connected to an inverter 301 by way of an element 304 for suppressing the flow of energy. The element 304 is arranged, for example, in the negative branch of the battery BAT and is designed as a diode (cathode points in the direction of the fuel cell BZ).

The inverters 301, 302, 303 are constructed in each case according to the inverter 101 from FIG. 1. The inverters 302 and 303 are connected in each case at the output to the nodes 309 to 311 by way of the three center taps of the electric switches. Each of the nodes 309 to 311 has a coil 312 to 314 of the electric machine EM. The coils 312 to 314 have preferably in each case a center tap, which is connected to one of the center taps of the electric switches of the inverter 301.

Furthermore, there is a precharging circuit 315 that couples the battery BAT and the double layer capacitor source SC. To this end the positive pole of the battery BAT is connected to the positive pole of the double layer capacitor source SC by way of a series circuit composed of a diode (anode-cathode) and a coil. The negative pole of the battery BAT is connected to the negative pole of the double layer capacitor source SC by way of a series circuit composed of an electric switch IGBT (emitter-collector) and a diode (cathode-anode). The precharging circuit 315 also has a diode, of which the cathode is connected to the center tap of the series circuit composed of diode and coil, and of which the anode is connected to the negative pole of the double layer capacitor source SC.

If, for example, the double layer capacitor source SC is operated with a state-of-charge dependent voltage between 350 V and 170 V and the battery BAT is operated with a load-dependent voltage between 170 V and 100 V, and the fuel cell BZ is operated with a load-dependent voltage between 50 V and 25 V, then it is advisable to use additional winding taps 312 to 314 on the electric machine EM for the inverter 301 of the fuel cell BZ. With this strategy it is possible to achieve that the voltage of the fuel cell BZ is transformed by a factor of two to four. For a factor of four one exploits the fact that a fuel cell BZ of low power output has a high internal resistance, and that the low voltage at the battery BAT occurs only when discharging the battery BAT. Thus, the circuit guarantees that a long term current flow from the fuel cell BZ into the battery BAT and the double layer capacitor source SC is suppressed.

Owing to the transforming translation it is possible to use, for example, for the branch of the fuel cell BZ, semiconductor switches with a lower blocking voltage and better feed-forward properties, to optimize the control times, and to use efficiently the fuel cell BZ for feeding the electric machine EM even at high rotational speeds.

The control circuit of the fuel cell BZ corresponds preferably to the embodiment (A), to which is added an uncontrolled element 304 for suppressing a regenerative energy flow. The control circuit of the battery BAT corresponds preferably to the embodiment (B), to which is added a controlled element 305 for suppressing temporarily a regenerative energy flow. The control circuit of the double layer capacitor source SC corresponds largely to the embodiment (A) without additional elements for suppressing the energy flows.

The energy flow is controlled according to the above description of the embodiments (A) and (B). In addition, the transforming translation between the branch of the fuel cell BZ and the other two branches for the battery BAT and the double layer capacitor source SC must be taken into consideration during field control. Furthermore, at this point it is possible to swap not only between the fuel cell BZ and the battery BAT (only in the direction of the battery BAT), between the fuel cell BZ and the double layer capacitor source SC (only in the direction of the double layer capacitor source SC) and between the battery BAT and the double layer capacitor source SC (bi-directional), but it is also possible to operate the electric machine EM on all sources (double layer capacitor source SC and battery BAT in motor and/or generator mode, fuel cell BZ only in motor mode).

Figure 8:
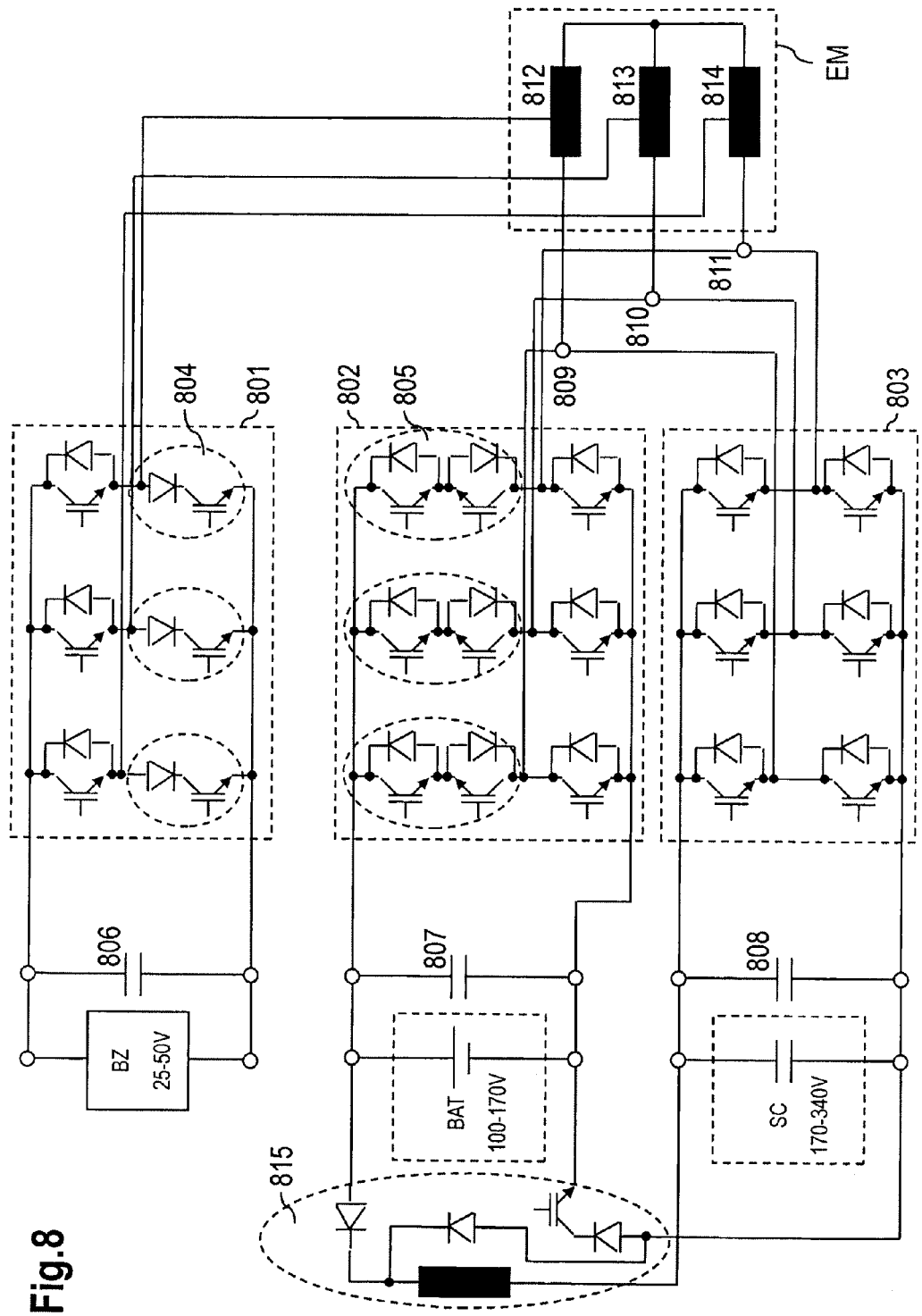
FIG. 8 is a schematic circuit diagram of another example of an arrangement for the parallel operation of several energy accumulators, wherein the elements for temporarily interrupting the energy flow are integrated into the inverters.

FIG. 8 shows another example of an arrangement for the parallel operation of multiple energy accumulators, wherein elements for temporarily interrupting the energy flow are integrated into the inverters.

Similar to the circuit according to FIG. 3, the circuit from FIG. 8 includes: a double layer capacitor source SC of high voltage (170-340 V), a battery BAT of average voltage (100-170V), a fuel cell BZ of low voltage (25-50 V), (three phase) inverter 801, 802, 803, and an electric machine EM with integrated transformer.

A filter 808 in the form of a capacitor is provided in parallel to the double layer capacitor source SC. The double layer capacitor source SC is connected to an inverter 803. The inverter 803 is constructed according to the inverter 101 from FIG. 1. The inverter 803 is connected at the output to the nodes 809 to 811 by way of the three center taps of the electric switches. Each of the nodes 809 to 811 has a coil 812 to 814 of the electric machine EM.

A filter 807 in the form of a capacitor is provided in parallel to the battery BAT. The battery BAT is connected to an inverter 802. The inverter 802 has a parallel circuit composed of three series circuits, wherein each series circuit has two electric switching units. The first electric switching unit comprises, for example, an IGBT comprising a freewheeling diode, which is arranged inversely to the collector-emitter path. A second electric switching unit 805 comprises two series-connected IGBTs, of which each one has a freewheeling diode, which is arranged inversely to the collector-emitter path, wherein the two IGBTs of the switching unit 805 have emitters that are connected together.

The series circuit composed of the two electric switching units IGBT and the switching unit 805 has one center tap for each branch, and each center tap is connected to one of the nodes 809 to 811. The two electric switching units can also be arranged so as to be mutually interchangeable.

The electric switch is configured, only by way of example, as an IGBT. The individual switches of the inverter 802 are suitably activated or deactivated by means of an actuating unit (not illustrated).

Each one of the nodes 809 to 811 has one coil each 812 to 814 of the electric machine EM.

A filter 806 in the form of a capacitor is provided in parallel to the fuel cell BZ. The fuel cell BZ is connected to an inverter 801. The inverter 801 has a parallel circuit composed of three series circuits, wherein each series circuit has two electric switching units. The first electric switching unit comprises, for example, an IGBT with a freewheeling diode, which is arranged inversely to the collector-emitter path. A second electric switching unit 804 comprises a series circuit composed of a diode and an IGBT, wherein the diode exhibits the same polarization as the emitter diode.

The series circuit composed of the two electric switching units IGBT and the switching unit 804 has one center tap for each branch, and each center tap is connected to a center tap of the coils 812 to 814.

The electric switch is configured, only by way of example, as an IGBT. The individual switches of the inverter 801 are suitably activated or deactivated by means of an actuating unit (not illustrated).

Furthermore, there is a precharging circuit 815 that couples the battery BAT and the double layer capacitor source SC. To this end the positive pole of the battery BAT is connected to the positive pole of the double layer capacitor source SC by way of a series circuit composed of a diode (anode-cathode) and a coil. The negative pole of the battery BAT is connected to the negative pole of the double layer capacitor source SC by way of a series circuit composed of an electric switch IGBT (emitter-collector) and a diode (cathode-anode). The precharging circuit 815 also has a diode, of which the cathode is connected to the center tap of the series circuit composed of diode and coil, and of which the anode is connected to the negative pole of the double layer capacitor source SC.

The switching unit 804 represents a backwards blocking switch, which can be implemented especially with internal circuitry or as a single chip. Correspondingly the switching unit 805 can be implemented as a bi-directional switch in the form of internal circuitry or as a single chip.

The switching units 804 and 805 are preferably elements for at least temporarily suppressing the flow of energy into or out of the sources or energy accumulator(s). The switching units 804 and 805 are integrated advantageously into the switching elements of the inverter. This feature can be achieved, for example, by wiring together commercially available elements. In particular, it is possible to integrate these elements, for example, in a monolithic manner into a chip, for example, using backwards blocking IGBTs, thyristors, etc. or bi-directionally switching FETs, IGBTs, etc.

The explained principle can also be applied correspondingly to the above circuits according to FIG. 1 or FIG. 2. The switching units 804 and 805 can be provided universally above or below in the illustrated inverters.

Electric Drive with Buffer

Preferably, an additional buffer is provided in the control unit. This buffer is dimensioned independently of the layout of the at least one electric energy accumulator and/or the at least one electric energy source, in such a way that its maximum voltage is larger than the (maximum) no-load voltage of the at least one electric energy accumulator and/or the at least one electric energy source. In particular, the voltage of the buffer can be at least equal to the maximum voltage of the electric machine in each operating case. The additional buffer is provided preferably at a direct voltage connector of the control unit.

The additional buffer is designed preferably in such a way that it can absorb periodically the energy stored inductively in the electric machine and can release the energy either to the electric machine or to another consumer (for example, a resistor or a varistor).

An electronic control unit includes preferably additional elements for the purpose of controlling the energy currents of the electric source and the additional buffer. These additional elements make it possible to switch between the individual paths. The design of the elements is based preferably on the energy source and/or the energy accumulator, in particular as a function of whether the voltage ranges of the electric energy source, the electric energy accumulator and/or the buffer overlap or not and which energy flow directions are allowable and/or necessary.

The embodiments depicted herein show, by way of example, such electric switches as IGBTs and diodes. However, it is also possible to install other switches, for example, transistors, MOSFET's, GTOs [gate turn offs], triacs, etc.

The embodiments are applicable to all known electric machine principles (delta connection, asynchronous machine, two phase machine, etc.). Additional systems for improving the properties of inverter bridges (for example, snubbers) can be combined with the illustrated circuits and/or embodiments.

Figure 4:
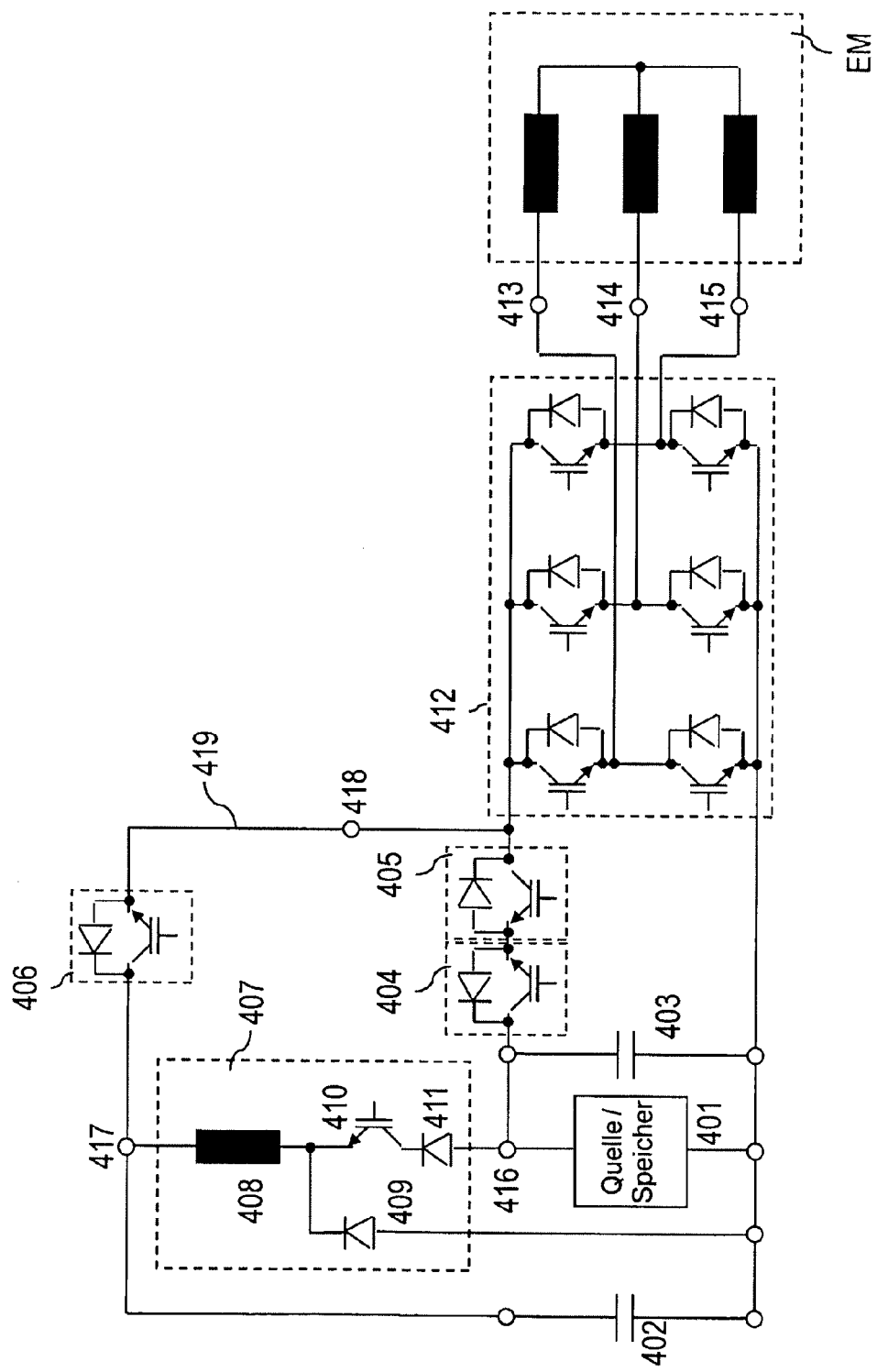
FIG. 4 is a schematic circuit diagram for operating an electric machine with any energy source and a buffer.

FIG. 4 shows a schematic circuit diagram for operating an electric machine EM with any energy source 401 and with a buffer 402. A filter 403, which is designed preferably in the form of a capacitor, is arranged in parallel with the energy source 401. The positive pole of the energy source 401 corresponds to a node 416 and is connected to a precharging circuit 407 and to an inverter 412 by way of a series circuit composed of an electric switch 404 and an electric switch 405. For the sake of a better overview, a node 418 is provided between the switch 405 and the inverter 412.

The switches 404 and 405 comprise in each case an IGBT with a freewheeling diode that is arranged inversely to the collector-emitter path. The collector-emitter path of the switch 404 points from the node 416 in the direction of the inverter 412; the collector-emitter path of the switch 405 points in the opposite direction.

The inverter 412 is constructed in a manner analogous to the inverter 101 from FIG. 1 and is connected at the output to the nodes 413 to 415 by way of the three center taps of the electric switches. Each of the nodes 413 to 415 has a coil of the electric machine EM.

The precharging circuit 407 includes two diodes 409, 411, an IGBT 410 and a coil 408. The node 416 is connected to the anode of the diode 411, of which the cathode is connected to the collector of the IGBT 410. The emitter of the IGBT 410 is connected to the cathode of the diode 409 and to the coil 408. The anode of the diode 409 is connected to the negative pole of the energy source 401. The remaining connector of the coil 408 is connected to a node 417. The buffer 402 is arranged between the node 417 and the negative pole of the energy source 401.

Furthermore, there is an electric switch 406 between the node 417 and the node 418. The electric switch 406 comprises an IGBT with a freewheeling diode that is arranged inversely to the collector-emitter path. In this case the collector-emitter path of the IGBT points in the direction of the node 418.

The precharging circuit 407 allows the buffer 402 to be precharged to the voltage level of the energy source 401 and, in so doing, prevents an uncontrolled balancing current between the two branches that act as the voltage source.

Following the precharging of the energy source 401, the switches 404 and 405 can be closed, and the electric machine EM can be operated correspondingly. Should an energy backflow into the energy source 401 be prevented, then the switches 404 and 405 are blocked, as a result of which the electric machine EM feeds its energy into the buffer 402 by way of line 419 and charges up said buffer.

In order to return the energy from the buffer 402 into the electric machine EM, the switch 406 is closed, and the electric machine EM is operated according to the well known control methods.

Preferably, the regulating unit of the electric machine EM uses the voltage, which is currently applied to the direct voltage terminals of the inverter 412, in order to determine a pulse pattern of the inverter 412.

When the switches 406 and 404, 405 are actuated, it must be ensured preferably that these switches are not closed simultaneously. This can be guaranteed, for example, by an EXCLUSIVE-OR (EXOR) actuation.

The buffer 402 is prevented in an advantageous way from discharging below a defined setpoint value (for example, the voltage of the energy source 401) by blocking the switch 406 on reaching a switch-off threshold.

The actuating signals for the switches 406 and 404, 405 can be modulated in their pulse width and can be linked to the actuating unit of the switches of the inverter 412. In this way the inverter 412 can be used in connection with the inductances of the electric machine EM as a bi-directional DC/DC converter between the energy source 401 and the buffer 402. In this way it is possible to specify the energy flow direction in any direction between the energy source 401, the buffer 402 and the electric machine EM. The energy flow direction can be changed with each actuating action.

Furthermore, the control operation can be switched between a modulated actuation and an unmodulated actuation (block timing), in order to minimize the switching losses in the additional switches.

Preferably, the buffer 402 can be dimensioned in such a way that the energy stored in the buffer 402 is adequate enough to operate the electric machine EM at the working points that are not suitable for an efficient operation of the electric machine EM on the energy source 401. In this case the buffer 402 can replace the energy source only during a portion of the electric period of the electric machine EM (for example, at the maximum of the induced voltages).

Figure 5:
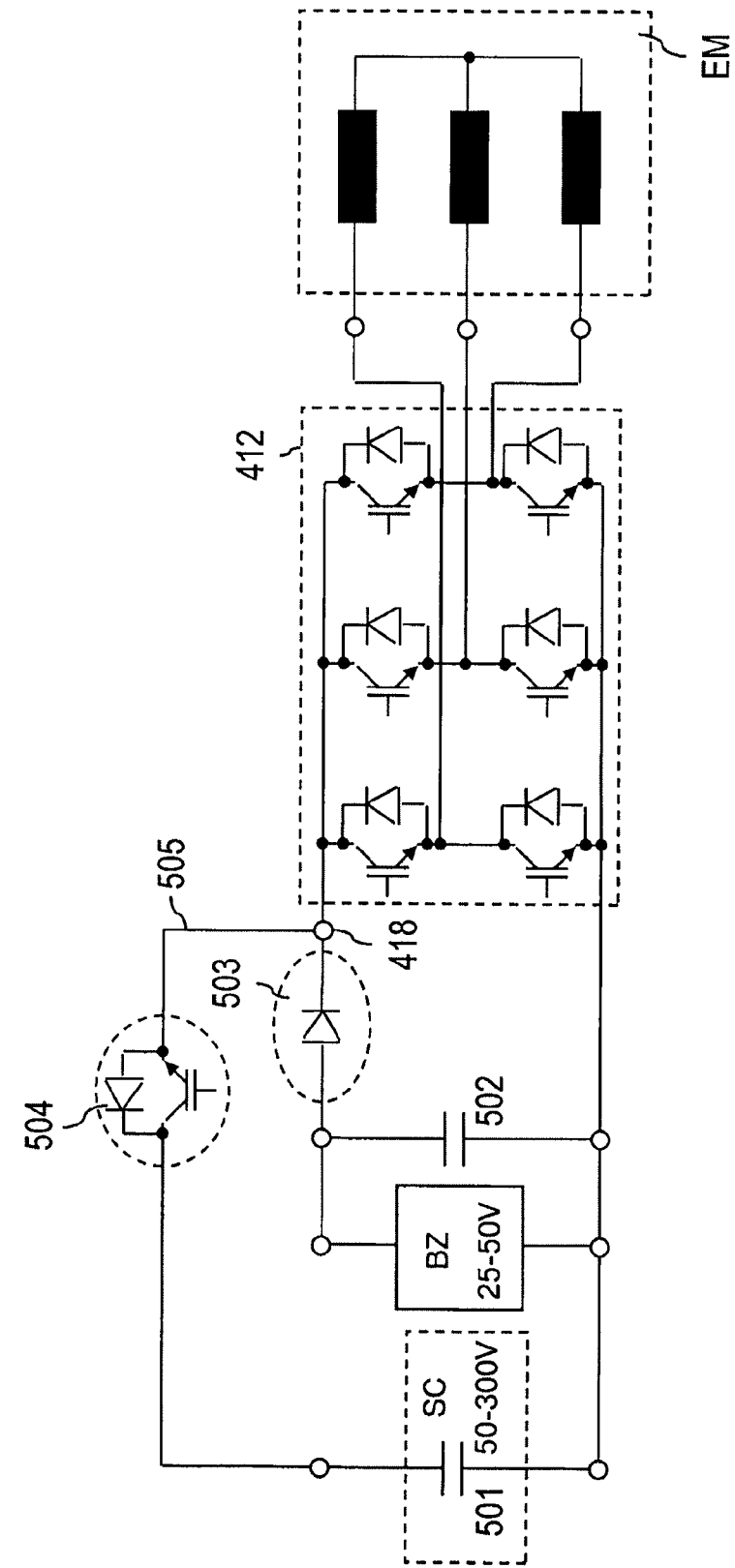
FIG. 5 is a schematic circuit diagram of an arrangement for an electric drive comprising a fuel cell as the energy source and a supercap as the buffer.

FIG. 5 shows an arrangement for an electric drive comprising a fuel cell BZ as the energy source and a supercap as the buffer 501. The unit consisting of inverter 412 and electric machine EM corresponds to the arrangement from FIG. 4 starting from the node 418 in the direction of the electric machine.

The buffer 501 is connected to the node 418 by way of an electric switch 504. The electric switch 504 comprises an IGBT with a freewheeling diode that is arranged inversely to the collector-emitter path. In this case the collector-emitter path of the IGBT points in the direction of the node 418.

A filter 502, which is designed preferably in the form of a capacitor, is arranged in parallel to the fuel cell BZ. The positive pole of the fuel cell BZ is connected to the node 418 by way of a switch 503, which is designed as a passive switching element in the form of a diode (the cathode points in the direction of the node 418).

The switch 503 prevents the energy from flowing black in the direction of the fuel cell BZ. The energy of the buffer 501 makes it possible to use the electric machine EM with high efficiency in motor mode even in the upper rotational speed range (for example, as a booster for acceleration operations, or in order to start the internal combustion engines in hybrid vehicles or in order to compensate for the turbo lags in internal combustion engines). A generator mode of the electric machine EM is possible, in particular, exclusively with the buffer 501.

Furthermore, with respect, for example, to the function of the switch 504, reference is made to the statements regarding FIG. 4.

Figure 6:
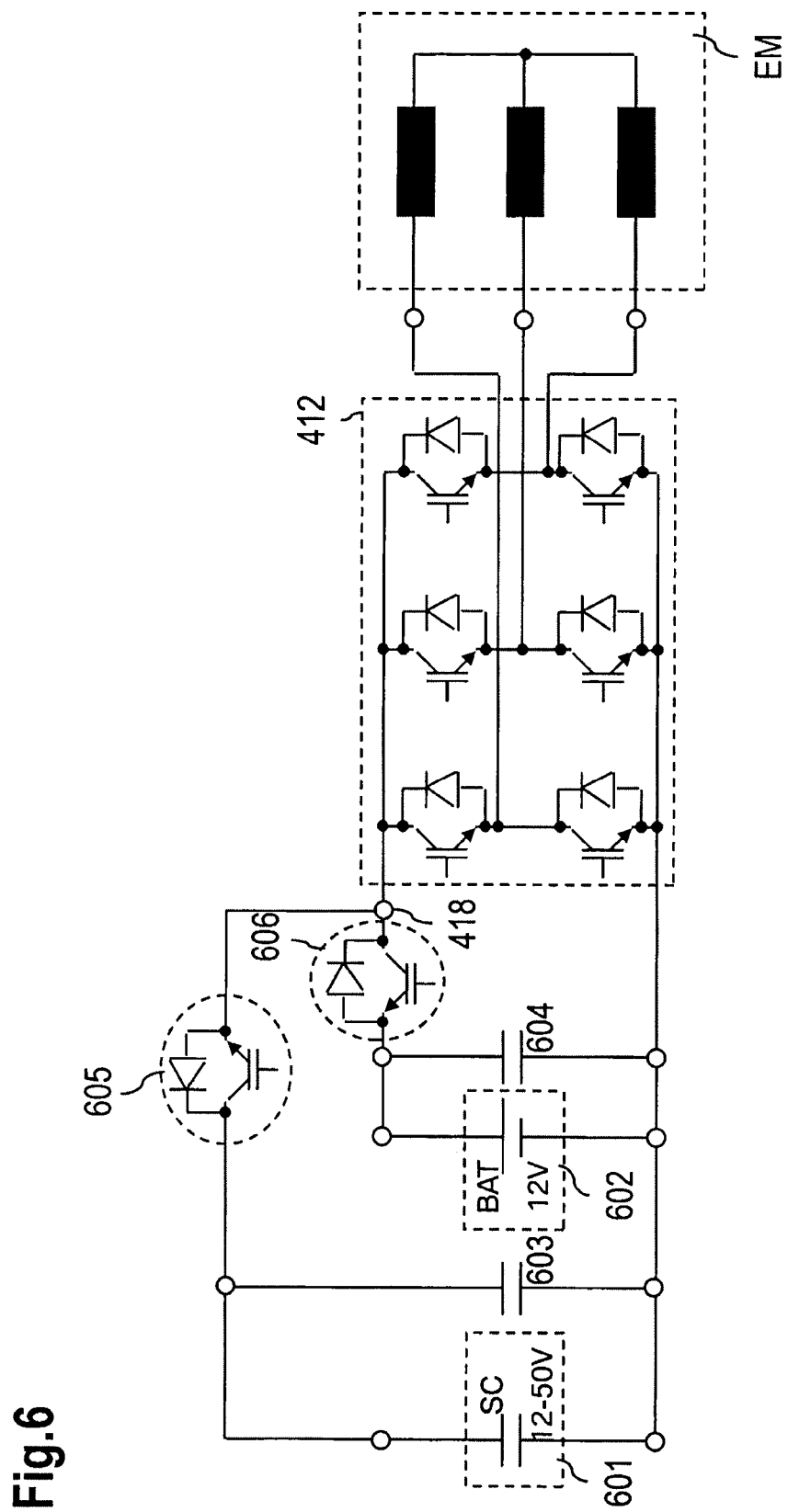
FIG. 6 is a schematic circuit diagram of an arrangement for an electric drive comprising a battery as the energy accumulator and a supercap as the buffer.

FIG. 6 shows an arrangement for an electric drive comprising a battery 602 as the energy accumulator and a supercap as the buffer 601. The unit consisting of inverter 412 and electric machine EM corresponds to the arrangement from FIG. 4 starting from the node 418 in the direction of the electric machine.

The buffer 601 is connected to the node 418 by way of an electric switch 605. The electric switch 605 comprises an IGBT with a freewheeling diode that is arranged inversely to the collector-emitter path. In this case the collector-emitter path of the IGBT points in the direction of the node 418. A filter 603, which is designed preferably in the form of a capacitor, is arranged in parallel to the buffer 601.

A filter 604, which is designed preferably in the form of a capacitor, is arranged in parallel to the battery 602. The positive pole of the battery 602 is connected to the node 418 by way of an electric switch 606. The electric switch 606 comprises an IGBT with a freewheeling diode that is arranged inversely to the collector-emitter path. In this case the collector-emitter path of the IGBT points in the direction of the battery 602.

When the battery 602 is used as the energy source, the circuit according to FIG. 4 is simplified in such a way that it is possible to dispense with all of the elements for a controlled precharging of the buffer 601. The buffer 601 corresponds in function and dimension to the aforementioned example. The other properties are apparent from the above explanations.

Figure 7:
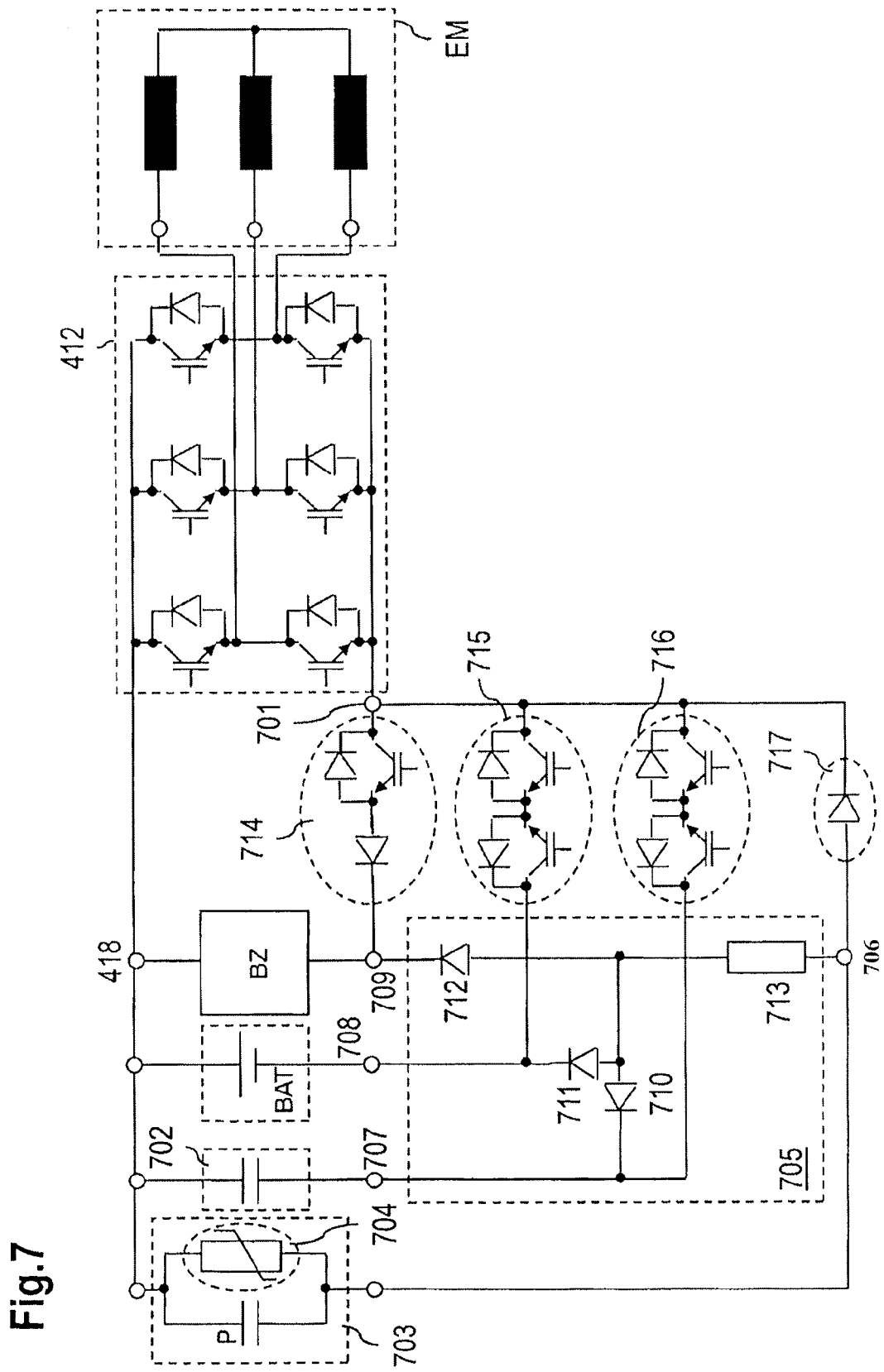
FIG. 7 is a schematic circuit diagram of an arrangement for an electric drive comprising a fuel cell as the energy source, a battery as the energy accumulator, a supercap as the buffer, and a capacitor-varistor combination as the buffer.

FIG. 7 shows an arrangement for an electric drive comprising a fuel cell BZ as the energy source, a battery BAT as the energy accumulator, a supercap 702 as the booster, and a capacitor-varistor combination as the buffer 703 without any energy backfeeding into the electric machine EM. The capacitor-varistor combination 703 comprises a parallel circuit comprising a capacitor P and a varistor 704 that serves as the excess voltage safety device for the capacitor P.

The unit consisting of inverter 412 and electric machine EM corresponds to the arrangement from FIG. 4 starting from the node 418 and starting from the node 701 in the direction of the electric machine EM. The positive poles of the capacitor-varistor combination 703, the supercap 702, the battery BAT and the fuel cell BZ are connected to the node 418. The negative pole of the capacitor-varistor combination 703 is connected to the node 706. The negative pole of the supercap 702 is connected to a node 707, the negative pole of the battery BAT is connected to the node 708, and the negative pole of the fuel cell BZ is connected to the node 709.

Furthermore, there is a precharging circuit 705 comprising three diodes 710 to 712 and a resistor 713. The cathode of the diode 710 is connected to the node 707; the anode of the diode 710 is connected to the anode of the diode 711 and to the anode of the diode 712 and to a connector of the resistor 713. The remaining connector of the resistor 713 is connected to the node 706. The cathode of the diode 711 is connected to the node 708, and the cathode of the diode 712 is connected to the node 709.

An electric switch 714 is arranged between the node 709 and the node 701 and comprises a series circuit consisting of a diode and an IGBT with a freewheeling diode that is arranged inversely to the collector-emitter path. In this case the collector-emitter path of the IGBT and the cathode of the diode point in the direction of the node 709. The switch 714 is provided for interrupting the flow of energy between the electric machine EM and the fuel cell BZ. To this end the switch 714 blocks bi-directionally or conducts uni-directionally.

An electric switch 715 is arranged between the node 708 and the node 701 and comprises two series-connected and opposing IGBTs, each of which exhibits a freewheeling diode that is arranged inversely to the collector-emitter path. The switch 715 is provided for interrupting the flow of energy between the electric machine EM and the battery BAT and can conduct or block bi-directionally.

An electric switch 716 is arranged between the node 707 and the node 701 and comprises two series-connected and opposing IGBTs, each of which exhibits a freewheeling diode that is arranged inversely to the collector-emitter path. The switch 716 is provided for interrupting the flow of energy between the electric machine EM and the supercap 702 and can conduct or block bi-directionally.

An uncontrolled switch 717 in the form of a diode is arranged between the node 706 and the node 701. In this case the cathode of the diode points in the direction of the node 701. The switch 717 serves the freewheeling between the electric machine EM and the capacitor-varistor combination 703.

The principle, illustrated in FIG. 4, can also be applied to a parallel use of multiple electric energy sources and energy accumulators for operating the electric machine EM. In this case the voltage ranges and the power output capability of the individual energy sources, the energy accumulators and the buffers can differ.

Such an interconnection of fuel cell BZ, battery BAT, supercap 702 and capacitor-varistor combination 703 as a buffer is practical, for example, in order to achieve optimal layouts for source and accumulator. That is, the fuel cell BZ with low kilowatt power output generates the entire energy required for a driving cycle, the battery BAT balances the average fluctuations of the power output required by the drive over longer distances, the supercap 702 balances large fluctuations in the power output required by the drive over short distances, and the capacitor-varistor combination 703 guarantees as the buffer in all operating states a reliable and efficient operation of the electric drive (low accumulator and source voltages can be expediently created even at high induced voltages of the electric machine without field weakening).

Working on this basis, the path is preferably configured for absorbing the energy that is stored inductively in the electric machine EM. To this end FIG. 7 provides a buffer branch that is coupled by means of freewheeling and comprises the capacitor-varistor combination 703.

The condition that the voltage of the buffer branch be at least equal to the maximum no-load voltage of the other sources is guaranteed by the precharging circuit 705. In the illustrated example, the energy is drawn from the capacitor-varistor combination 703 by means of the voltage limiting varistor 704.

It is also possible to represent this function by suitably dimensioning at least one energy accumulator with respect to its maximum voltage by actuating the switching elements, which are installed for the modulation of the flow of energy into the accumulators. In such a case it would be possible to dispense with the buffer branch, which is shown in FIG. 7, and the circuit for precharging.

With respect to the other properties of the circuit arrangement according to FIG. 7, reference is made to the above explanations.

Other Advantages

The strategy that is described here makes it possible to provide vehicles with high electric power output in the drive train as well as also with a large cruising radius based on the electric energy. In this case it is possible to achieve or rather set, in particular, with respect to both target variables (electric power output in the drive train and cruising radius) optimal efficiency, for example, for a certain requirement profile.

This approach can be employed in hybrid vehicles on the basis of known electric accumulators (for example, supercap, lithium ion battery, nickel metal hybrid battery) and also in combination with alternative electric energy sources (for example, fuel cell).

By decoupling the energy and power output requirement for the electric accumulators (or rather the electric energy sources) it is possible to dimension in a cost effective way the electric accumulators (or rather electric energy sources) with simultaneously long service life.

Furthermore, the system shows a high redundancy. If one energy source fails, another energy source can take over in an emergency operation.

Owing to the good controllability of the power split between the various energy sources, an operating strategy of the vehicle can be achieved and set in a convenient way.

The thermal load on the energy sources is significantly reduced due to the adaptation of the required power output to the respective optimal operating point of the energy source. In this case the cost of cooling the traction batteries can be significantly reduced. For example, in the event that supercap and battery are combined, it is possible to dispense with the cooling of the battery.

The system described herein to link together a variety of electric energy accumulators can be implemented both with respect to the hardware and also with respect to the software in the existing electrical systems of vehicles. In particular, it is possible to continue to use the conventional electric machines and their associated control concepts.

The variable split between the cruising radius requirement and the power requirement among the various energy sources allows with little effort a correspondingly variable configuration of form and size of the energy sources and, thus, a design of the various hybrid concepts that is tailored exactly to the requirements—for example:

(a) Hybrid vehicles with RangeExtender: the electric cruising radius is extended with an additional electric energy source. The electric cruising radius of the vehicle can be adapted as an assembly variant to the buyer's request, independently of the retrievable power.

(b) Hybrid vehicle with PowerBooster: fast startup acceleration by means of the electric drive and, thus, cultivated electric compensation for turbo lags or the like can be achieved by use of an additional energy source. Thus, the available electric power can be adapted, as an assembly variant, to the buyer's request, independently of the electric cruising radius of the vehicle.

Furthermore, the strategy described herein improves the reliability and efficiency of hybrid drives.

The configuration of the electric drive has a new degree of freedom, because the maximum allowable no-load voltage of the electric machine is independent of the maximum no-load voltage of the energy source.

The strategy described herein can also be used for small electric drives, for example, starters, generators and/or starter generators and is also suitable for use in small and lightweight vehicles (for example, in motorcycles).

Electric Drive with Multiple Electric Energy Sources (and/or Electric Energy Accumulators):

Furthermore, the following approach may help to avoid a high financial outlay in symmetry elements for the electric accumulators and to provide high voltages if a plurality of accumulators are used in parallel. In this respect at least two electric energy sources (or energy accumulators, energy systems, generators, etc.) can be connected together in series. In particular, the invention provides various voltage levels by use of at least two electric energy sources. Such a strategy is also called a "multi-level approach."

Figure 9:
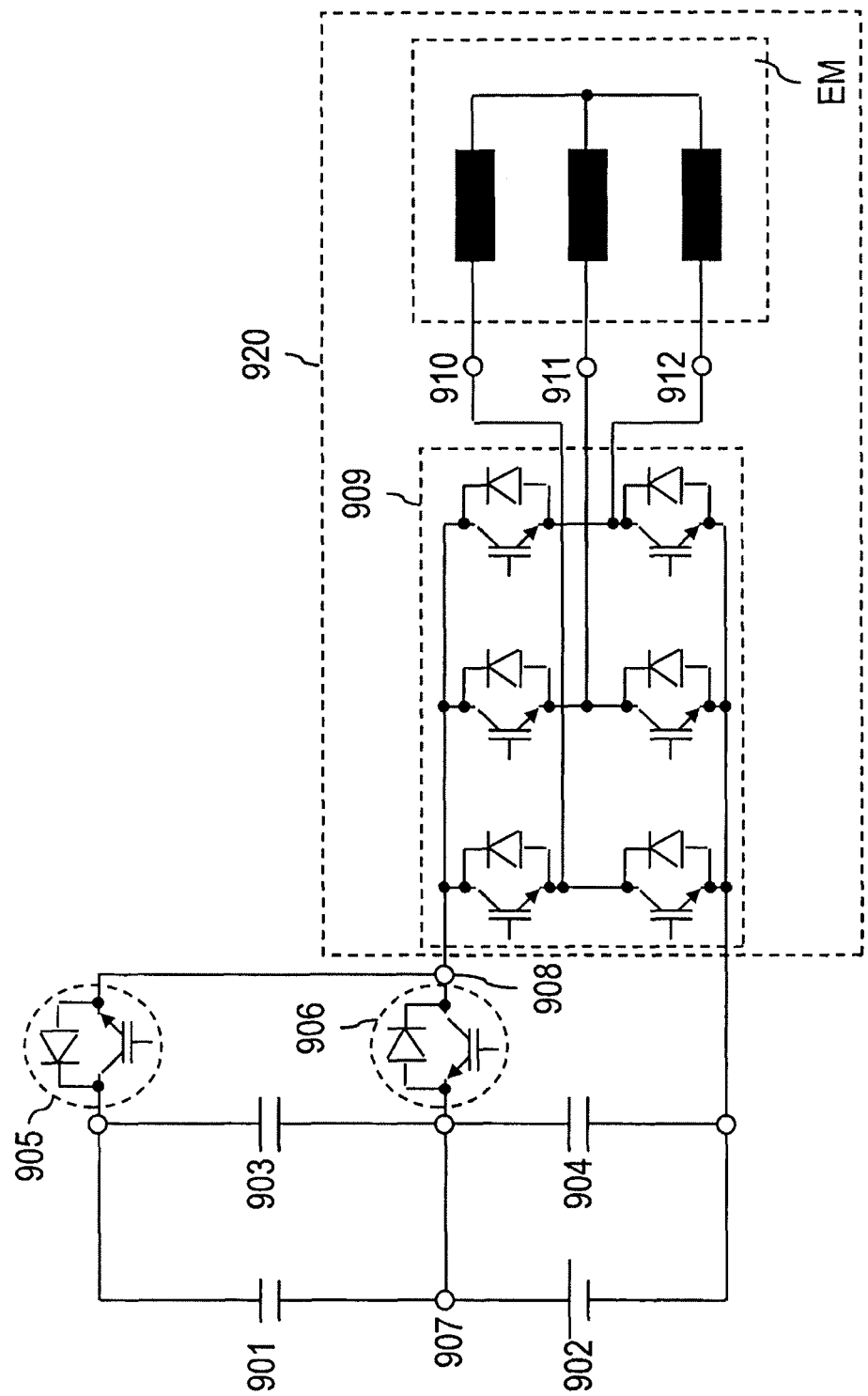
FIG. 9 is a schematic circuit diagram for operating an electric machine with multiple energy sources (for example, energy accumulators), wherein the energy sources can be activated by choice.

FIG. 9 shows a schematic circuit diagram for operating an electric machine EM with multiple energy sources (for example, energy accumulators) 901 and 902 for operating selectively the energy source 902 or both energy sources 901 and 902. The circuit can be used advantageously in cases, in which the energy content of the energy source 902 is greater than the energy content of the energy source 901. In particular, the energy source 901 can be designed as a capacitor, and the energy source 902 can be designed as a battery.

The energy sources 901 and 902 can be connected together in series. The center tap of this series circuit corresponds to a node 907. A filter 903 is arranged in parallel to the energy source 901, and a filter 904 is arranged in parallel to the energy source 904. The filters 903 and 904 are designed preferably as capacitors.

Furthermore, the positive pole of the energy source 901 is connected to a node 908 by way of a switch 905. The switch 905 comprises an IGBT with a freewheeling diode that is arranged inversely to the collector-emitter path. The collector-emitter path of the switch 905 points in the direction of the node 908.

The switch 905 with the freewheeling diode enables, on the one hand, a freewheeling between the electric machine EM and the energy sources 901 and 902 and, on the other, a switching function for the energy feed from the energy sources 901 and 902 into the electric machine EM.

A switch 906 is arranged between the node 907 and the node 908. The switch 906 comprises an IGBT with a freewheeling diode that is arranged inversely to the collector-emitter path. The collector-emitter path of the switch 906 points in the direction of the node 907. The switch 906 with the freewheeling diode interrupts, if desired, the flow of energy between the electric machine EM and the energy source 902.

Furthermore, FIG. 9 shows an inverter 909, which is constructed in a manner analogous to the inverter 101 from FIG. 1, and can be connected at the output to the nodes 910 to 912 by way of the three center taps of the electric switches. Each of the nodes 910 to 912 has a coil of the electric machine EM. The node 908 and the negative pole of the energy source 902 are connected to the inverter 909.

At this point it must be pointed out that the combination of inverter 909 and electric machine according to the drawing in FIG. 9 is also used in the following figures and is referred to as a unit 920 for the sake of a better overview.

The two energy sources 901 and 902 represent bi-directionally loadable accumulators. The energy source 902 can be loaded both individually and also together with the energy source 901 by way of the inverter 909.

Figure 10:
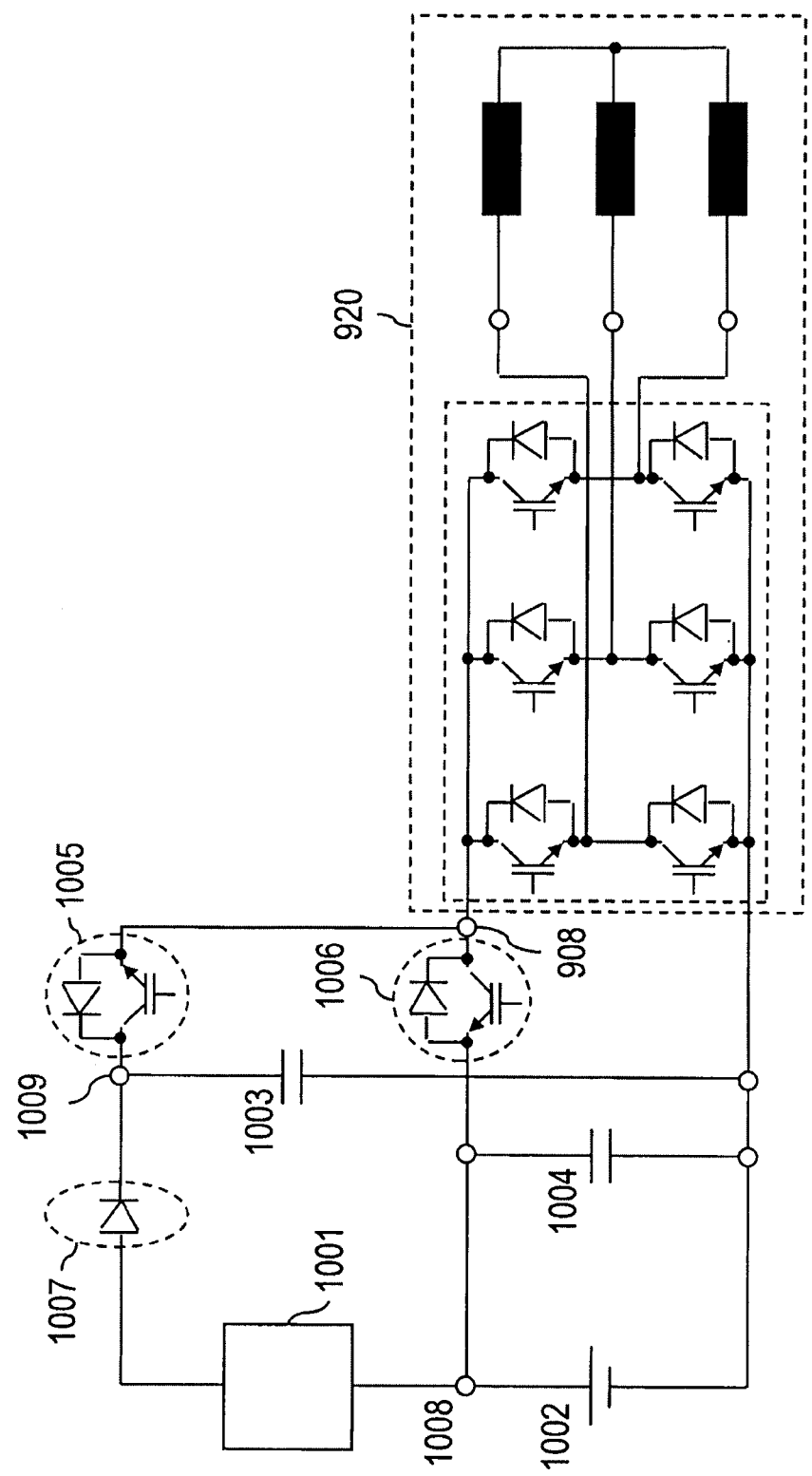
FIG. 10 is a schematic circuit diagram for operating an electric machine with multiple energy sources, wherein, for example, an energy source is configured as a mono-directional energy source (sink)

FIG. 10 shows a schematic circuit diagram for operating an electric machine EM with multiple energy sources, wherein, for example, one energy source is configured as a mono-directional energy source (sink). A series circuit exhibits a mono-directional source 1001 and an energy source 1002 (for example, a battery). The center tap of the series circuit is referred to as the node 1008. A filter 1004, which is designed preferably as a capacitor, is arranged in parallel to the energy source 1002.

The positive pole of the source 1001 is connected to a node 1009 by way of a switch 1007. The cathode of the diode 1007 points in the direction of the node 1009. Thus, the diode 1007 prevents the energy from flowing back into the source 1001.

A filter 1003 is connected, on the one hand, to the node 1009 and, on the other hand, to the negative pole of the energy source 1002. The filter 1003 is designed preferably as a capacitor. A switch 1005 is provided between the node 1009 and a node 908. The switch 1005 comprises an IGBT with a freewheeling diode that is arranged inversely to the collector-emitter path. The collector-emitter path of the switch 1005 points in the direction of the node 908.

The switch 1005 with the freewheeling diode enables, on the one hand, a freewheeling between the electric machine EM and the source 1001 and the filter 1003 and, on the other hand, a switching function for the energy feed from the energy sources 1001 and 1002 into the electric machine EM.

A switch 1006 is arranged between the node 1008 and the node 908. The switch 1006 comprises an IGBT with a freewheeling diode that is arranged inversely to the collector-emitter path. The collector-emitter path of the switch 1006 points in the direction of the node 1008. The switch 1006 with the freewheeling diode interrupts, if desired, the flow of energy between the electric machine EM and the energy source 1002.

Furthermore, FIG. 10 shows the unit 920 comprising an inverter and an electric machine, according to FIG. 9. Thus, the node 908 and the negative pole of the energy source 1002 are connected to the unit 920.

According to the example from FIG. 10, the source 1001 is loaded only with a withdrawal of electric energy, whereas the energy source 1002 can both release and absorb energy. In each switching state a short term energy backflow from the electric machine EM is possible by means of the filters 1003, 1004.

Figure 11:
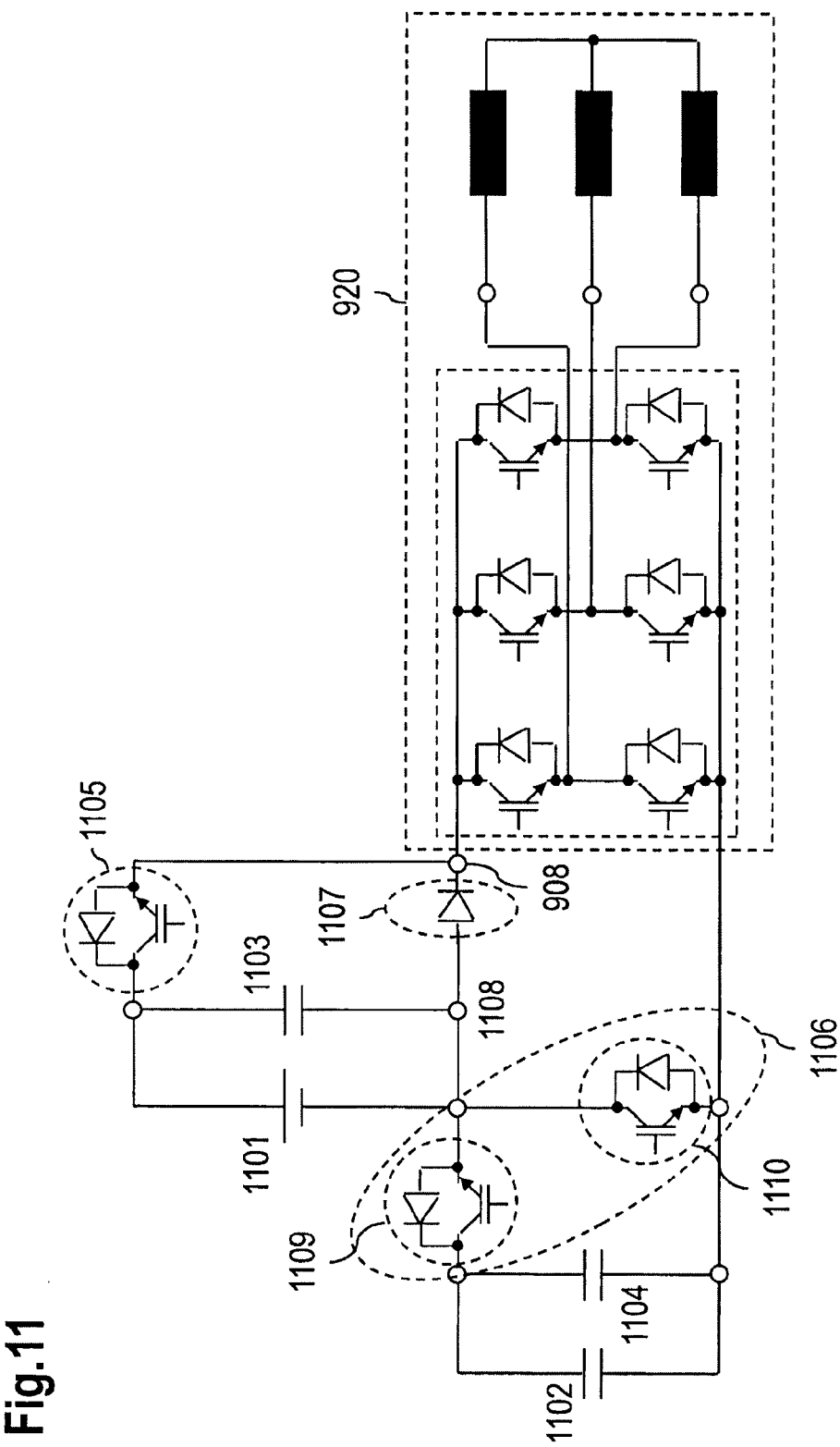
FIG. 11 is a schematic circuit diagram for operating an electric machine with multiple energy sources, wherein it is possible to switch between two energy sources.

FIG. 11 shows a schematic circuit diagram for operating an electric machine EM with multiple energy sources, wherein it is possible to switch between two energy sources. A filter 1103, which is designed preferably in the form of a capacitor, is provided in parallel to the energy source 1101. The positive pole of the energy source 1101 is connected to a node 908 by way of a switch 1105, and the negative pole of the energy source 1101 is connected to a node 1108. A diode 1107 is provided between the node 1108 and the node 908. The cathode of the diode points in the direction of the node 908. Thus, the diode 1107 prevents a short circuit by way of the energy source 1101.

The switch 1105 comprises an IGBT with a freewheeling diode that is arranged inversely to the collector-emitter path. The collector-emitter path of the switch 1105 points in the direction of the node 908. The switch 1105 with the freewheeling diode enables, on the one hand, an energy feed from the energy source 1101 into the electric machine EM and, on the other hand, a freewheeling for an energy backflow from the electric machine into the energy source 1101.

An energy source 1102 is connected to the node 1108 by way of its positive pole via a switch 1109. A filter 1104, which is designed preferably as a capacitor, is provided in parallel to the energy source 1102. Furthermore a switch 1110 is arranged between the node 1108 and the negative pole of the energy source 1102.

The switch 1109 comprises an IGBT with a freewheeling diode that is arranged inversely to the collector-emitter path. The collector-emitter path of the switch 1109 points in the direction of the node 1108. The switch 1110 comprises an IGBT with a freewheeling diode that is arranged inversely to the collector-emitter path. The collector-emitter path of the switch 1110 points in the direction of the negative pole of the energy source 1102. Optionally the switch 1110 can be designed in the form of the IGBT or the freewheeling diode.

The combination 1106 consisting of switches 1109 and 1110 represents a changeover switch for bridging the energy source 1102. The associated freewheeling guarantees that an energy backflow from the electric machine EM is possible. If the IGBT or the diode is left out of the switch 1110, then a single source mode operation of the energy source 1101 is possible only in one energy flow direction.

Correspondingly any energy flow direction can be set and/or preset by means of suitably selected switches. Thus, different types of energy sources, in particular, energy sources that are intended for other areas of application and that act only as energy sinks in the present circuit can be suitably supported.

Furthermore, FIG. 11 shows the unit 920 comprising an inverter and an electric machine, according to FIG. 9. Thus, the node 908 and the negative pole of the energy source 1102 are connected to the unit 920.

Figure 12:
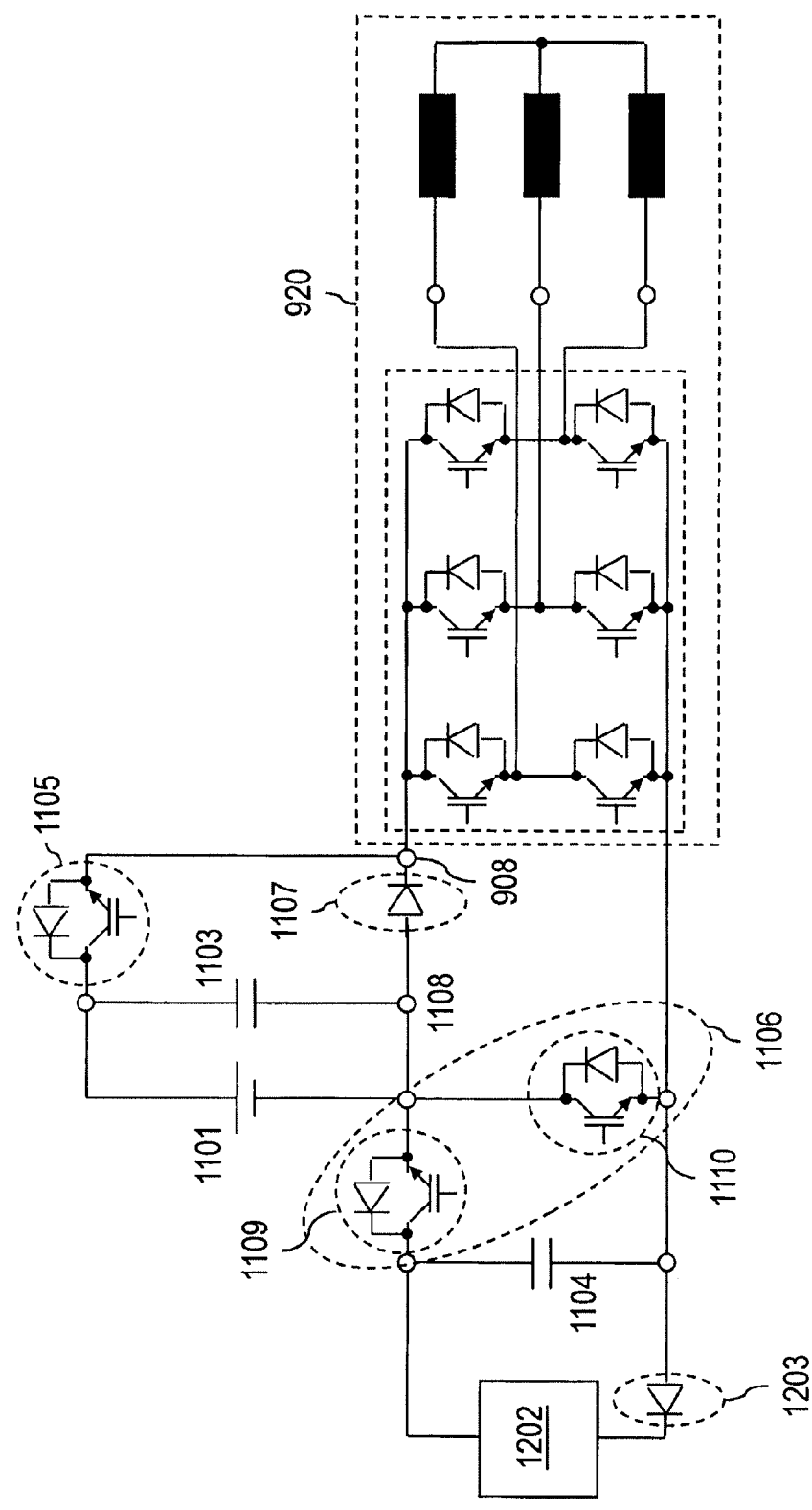
FIG. 12 is a schematic circuit diagram, based on the depiction from FIG. 11, wherein one energy source is a mono-directional energy source.

FIG. 12 shows a schematic circuit diagram, which corresponds largely to the drawing from FIG. 11. In this respect, reference is made to the above statements. Instead of the energy source 1102, FIG. 12 provides a series circuit comprising a source 1202 and a diode 1203, wherein the cathode of the diode 1203 is connected to the negative pole of the source 1202, and the anode of the diode 1203 is connected to the unit 920.

The switch 1005 with the freewheeling diode enables, on the one hand, an energy feed from the energy source 1101 into the electric machine EM and, on the other hand, freewheeling for the energy backflow from the electric machine into the energy source 1101.

The changeover switch 1106 guarantees a bridging of the source 1202 in the event of an energy backfeed. The changeover switch 1106 also enables a freewheeling for the energy backflow from the electric machine EM. If the diode is left out of the switch 1110, then a single mode operation of the energy source 1101 is possible only during a backfeed from the electric machine EM.

Therefore, the FIGS. 11 and 12 show some potential operating modes at DC connectors of the inverter for some exemplary energy sources.

All of the additional switching elements can be switched, as described above, at any time and preferably at a clock frequency that is comparable to the inverter pulse.

The strategy described herein can use various numbers of energy sources (for example, energy accumulators, sources or sinks). In particular, the energy source can also be an energy sink (in this case the sink can be used, for example, as an energy source for an additional consumer).

It is advantageous to consider with respect to the current-carrying capacity of the individual elements that they are adapted to each other, subject to the polarity sign, both for the instantaneous values and also for a temporal load. This applies especially when operating the series-connected energy sources.

As a result, the complexity of accumulator systems with multiple energy accumulators can be further minimized. In particular, the voltages in the circuits with energy sources arranged in series circuits add up, so that, for example, in the case of stacked energy sources (for example, batteries, supercaps, fuel cells, solar panels, thermoelectric generators) the cost of balancing the cell group and/or the control of the individual, optimized operating points can be significantly reduced.

An armature setting range of the electric machine can be configured with respect to the sum of the voltages of the series-connected accumulator elements. This approach makes it possible to achieve at least a temporarily extended working range of the electric drive system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A circuit arrangement for supplying an electric drive coupleable to at least two electric energy sources, the circuit arrangement comprising:
at least two inverter bridges operatively configured such that at least one of said at least two electric energy sources supply the electric drive at least intermittently by way of the at least one inverter bridge, wherein each of the at least two electric energy sources is associated with a corresponding one of the at least two inverter bridges;
a filter operatively connected in parallel with a corresponding one of the at least two electric energy sources; and
a switch operatively configured for disconnecting at least one electric energy source from the electric drive, wherein at least one of the electric energy sources that is disconnectable from the electric drive via the switch is connected in series with and has a direct voltage lower than that of another of the electric energy sources.

2. The circuit arrangement according to claim 1, wherein the switch is uncontrolled and comprises a diode.

3. The circuit arrangement according to claim 1, wherein the switch is a controlled switch comprising at least one of:
a transistor;
an IGBT;
an FET;
a thyristor;
a triac; and
a dynistor.

4. The circuit arrangement according to claim 1, wherein the electric drive is an electric machine.

5. The circuit arrangement according to claim 4, wherein the at least two electric energy sources are arranged with the circuit arrangement in a motor vehicle.

6. The circuit arrangement according to claim 1, wherein the at least two electric energy sources are arranged with the circuit arrangement in a motor vehicle.

7. The circuit arrangement according to claim 1, wherein at least one of the at least two electric energy sources comprise at least one of the following energy sources:
a fuel cell;
a battery; and
a double-layer capacitor source.

8. The circuit arrangement according to claim 1, wherein the at least two inverter bridges are each operatively configured to support three phases.

9. The circuit arrangement according to claim 8, wherein the buffer has a voltage essentially as large as a largest no-load voltage of the electric energy sources.

10. The circuit arrangement according to claim 9, wherein the buffer has a voltage essentially as large as a maximum voltage of the electric drive.

11. The circuit arrangement according to claim 1, further comprising a buffer for at least one of absorbing and making available electric energy.

12. The circuit arrangement according to claim 11, wherein the buffer has a voltage essentially as large as a maximum voltage of the electric drive.

13. The circuit arrangement according to claim 11, wherein the buffer is operatively configured to absorb energy stored inductively in the electric drive and release said energy to one of the electric drive and another consumer.

14. The circuit arrangement according to claim 1, wherein the at least two series-coupled electric energy sources are activateable either individually or jointly.

15. The circuit arrangement according to claim 14, wherein the at least two series-coupled electric energy sources are activateable individually or jointly via at least one electronic switch.

16. The circuit arrangement according to claim 1, further comprising a changeover switch operatively configured to switch between the at least two electric energy sources.

17. The circuit arrangement according to claim 1, wherein at least one of said one electric energy source is a monodirectional energy source.

18. The circuit arrangement according to claim 1, wherein said at least two electric energy sources have at least one of different voltages and different power outputs.

19. A method for operating a circuit arrangement for supplying an electric drive to which at least two electric energy sources are coupleable, the method comprising the acts of:
supplying at least intermittently the electric drive with electric energy from at least one of the two electric energy sources via at least two inverter bridges, wherein each of the at least two electric energy sources is associated with a corresponding one of the at least inverter bridges;
reducing an electrical load on one of the at least two electrical energy sources using a filter operatively connected in parallel with the one of at least two electric energy sources; and
disconnecting at least one electric energy source from the electric drive via a switch, wherein at least one of the electric energy sources that is disconnectable from the electric drive via the switch is connected in series with and has a direct voltage lower than that of another of the electric energy sources.

20. A motor vehicle, comprising:
an electric drive;
at least two electric energy sources;
a circuit arrangement for supplying the electric drive, the electric drive being coupleable to the at least two electric energy sources;
at least two inverter bridges operatively configured such that at least one of said at least two electric energy sources supply the electric drive at least intermittently by way of the at least one inverter bridge, wherein each of the at least two electric energy sources is associated with a corresponding one of the at least two inverter bridges;
a filter operatively connected in parallel with a corresponding one of the at least two electric energy sources; and
a switch operatively configured for disconnecting at least one electric energy source from the electric drive, wherein at least one of the electric energy sources that is disconnectable from the electric drive via the switch is connected in series with and has a direct voltage lower than that of another of the electric energy sources.

* * * * *